(12) United States Patent
Aoki et al.

(10) Patent No.: US 7,043,132 B2
(45) Date of Patent: May 9, 2006

(54) VARIABLE OPTICAL ATTENUATOR HAVING A WAVEGUIDE AND AN OPTICALLY COUPLED LAYER WITH A POWER MONITOR

(75) Inventors: Shigenori Aoki, Sunnyvale, CA (US); Kishio Yokouchi, San Jose, CA (US); Hiroshi Nagaeda, Kitahiroshima (JP); Kaoru Sugimoto, Kawasaki (JP); Alexei Glebov, San Mateo, CA (US)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 10/761,619

(22) Filed: Jan. 21, 2004

(65) Prior Publication Data
US 2005/0157983 A1    Jul. 21, 2005

(51) Int. Cl.
*G02B 6/00* (2006.01)
(52) U.S. Cl. .............................. 385/140; 385/8; 385/40
(58) Field of Classification Search ................ 385/140
See application file for complete search history.

(56) References Cited
U.S. PATENT DOCUMENTS

| 5,966,493 A | * | 10/1999 | Wagoner et al. ............ 385/140 |
| 6,441,955 B1 | | 8/2002 | Takatsu et al. ............. 359/341.4 |
| 6,546,163 B1 | | 4/2003 | Thackara ...................... 385/18 |
| 6,553,175 B1 | | 4/2003 | Jaspan ......................... 385/140 |
| 2003/0103708 A1 | * | 6/2003 | Galstian et al. .............. 385/1 |
| 2004/0126079 A1 | * | 7/2004 | Aoki et al. .................. 385/140 |
| 2005/0002634 A1 | * | 1/2005 | Glebov et al. .............. 385/140 |

\* cited by examiner

*Primary Examiner*—Kaveh Kianni
*Assistant Examiner*—Derek L. Dupuis
(74) *Attorney, Agent, or Firm*—Sheppard Mullin Richter & Hampton LLP

(57) ABSTRACT

The intensity of signals in optical networks can be controlled using a variable optical attenuator (VOA). The present invention is a VOA that is particularly well suited for optical networks, for example to provide channel-by-channel normalization of gain control of wavelength division multiplexed signals. The inventive VOA includes a waveguide having a cladding that includes an electro-optical material and electrodes that produce an electric field within the electro-optical material when a voltage difference is applied to the electrodes. The VOA also includes a layer that is parallel to the core of the waveguide and that optically couples to the core to receive light from the attenuated signal. A power meter receives light from the layer as an indication of the amount of light attenuated from the signal and for controlling the voltage to the electrodes.

18 Claims, 21 Drawing Sheets

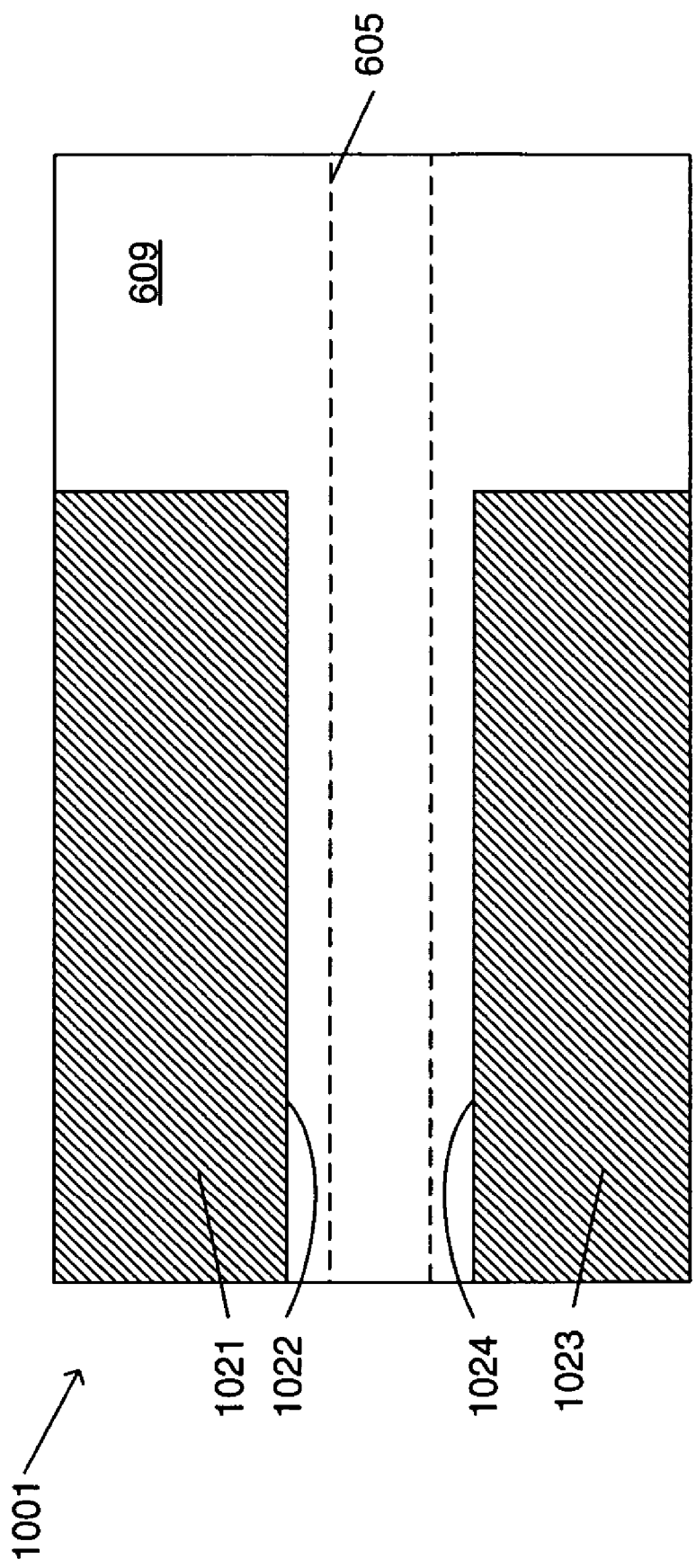

VARIABLE OPTICAL ATTENUATOR HAVING A WAVEGUIDE AND AN OPTICALLY COUPLED LAYER WITH A POWER MONITOR

FIELD OF THE INVENTION

The present invention relates generally to optical communications device technology, and more particularly, to variable optical attenuators formed on electro-optical materials.

BACKGROUND OF THE INVENTION

High-speed optical networks transmit information long distances as light signals through optical fiber networks. Amplification of optical signals, preferably using optical amplifiers, is required at regular intervals along a long distance network to maintain signal strength. Since some advanced networking techniques transmit many channels simultaneously through the same fiber, it is important that the gain is the same for each channel. For example, networks that use wavelength division multiplexing (WDM) transmit many channels over the same fiber, with each channel at a different wavelength. Since current optical amplifiers have wavelength dependent gains, repeated amplification can distort the information being transmitted. Wavelength-dependent gain can be overcome by optical equalization of the different signal channels. In practice, this equalization is performed by use of a variable optical attenuator (VOA).

There are several types of VOAs currently available. In one type of VOA, a Mach-Zehnder interferometer has a material in the optical path having a temperature dependent refractive index (the "thermo-optic effect"). The interferometer is configured such that a change in the temperature of the thermo-optic material results in a change in the output light intensity. Attenuation is thus adjusted by control of the temperature of the thermo-optic material. Although thermo-optic VOAs have good optical coupling properties and are polarization independent, they suffer from high power usage and a relatively slow response time of greater than 10 ms, and thus they are not appropriate for high speed networking.

Another currently available VOA employs micro-electro-mechanical system (MEMS) elements, in which movable, micro-elements are used to attenuate light. MEMS devices are also relatively slow, with response times on the order of milliseconds, and have reliability issues resulting from the many moving parts of the VOA.

In addition to speed and reliability, there is also a need to have VOAs that can be assembled into arrays or into other devices. For the large number of channels envisioned for WDM networks, it would be a great advantage to be able to fabricate VOAs of smaller size, to assemble VOAs into arrays, and to incorporate them into other WDM devices, such as multiplexers or demultiplexers. Heretofore, it has been difficult to configure VOAs into arrays or within other devices.

Therefore, it would be desirable to have a VOA that is faster than currently available devices, and that can be assembled in large numbers as an array. It is also desirable to have a VOA that is manufactured by techniques that allow for integration into other WDM devices.

SUMMARY OF THE INVENTION

The present invention solves the above-identified problems with VOAs by providing waveguides having attenuation that is controlled by application of an electric field to an electro-optical material that is part of the waveguide or is adjacent to a cladding of the waveguide.

It is one aspect of the present invention to provide a device for variably attenuating an optical signal having a waveguide and a layer, each with a first refractive index, separated by a cladding of variable refractive index. A portion of the cladding between the waveguide and layer includes an EO material and electrodes that provide an electric field for varying the refractive index of the EO material according to the voltage difference between the electrodes. In one embodiment, the cladding and EO material have a second refractive index in the absence of an electric field, resulting in a low-loss waveguide. The EO material can be changed to have the first refractive index by the application of a voltage difference, resulting in a high-loss waveguide, where a large portion of the light is coupled into the layer and thereby attenuated. A sensor optically coupled to the layer provides an indication of the amount of light removed from the attenuated signal that can be used to control the voltage applied to the electrodes. In another embodiment, the invention comprises an array of individual devices for variably attenuating individual ones of a plurality of optical signals.

It is another aspect of the present invention to provide a device for variably attenuating an optical signal. The device includes a waveguide having a core with a first refractive index and a cladding comprising a material with a second refractive index and an EO material having a first side adjacent to the core and a second side distal from the core. The device also includes a pair of electrodes to produce an electric field within the EO material and change the refractive index of said EO material, and a layer adjacent to the second side of the EO material and having a refractive index approximately equal to the first refractive index. The amount of incident waveguide light transmitted through said waveguide varies with the voltage applied to the pair of electrodes, with at least a portion of incident light not transmitted through said waveguide being transmitted along said layer. It is preferred that the refractive index of the EO material varies with the applied voltage difference from the first refractive index to the second refractive index. In one embodiment, a sensor is optically coupled to the layer to produce an output proportional to the light in the layer. It is preferred that a controller receives the sensor output and controls a voltage difference to the electrodes. In another embodiment, the first material is on a substrate. One of the pair of electrodes is between the substrate and first material, and the other of the pair of electrodes is on the layer distal to the core. In yet another embodiment, each of the pair of electrodes are coplanar and parallel with the waveguide, each of the pair of electrodes has an edge, the pair of edges has a spacing, and at least a portion of the EO material is between the pair of edges. The spacing may be either constant or can be regularly repeated along the waveguide.

It is yet another aspect of the present invention to provide an array of devices for variably attenuating a plurality of optical signal. The array includes a plurality of spaced waveguides. Each waveguide has a core with a first refractive index and a cladding comprising a material with a second refractive index and an EO material having a first side adjacent to the core and a second side distal from the core. The device also includes a pair of electrodes to produce an electric field within the EO material and change the refractive index of said EO material, and a layer adjacent to the second side of the EO material and having a refractive index approximately equal to the first refractive index. The amount of incident waveguide light transmitted through said waveguide varies with the voltage applied to the pair of electrodes, with at least a portion of incident light not transmitted through said waveguide being transmitted along said layer. It is preferred that the refractive index of the EO material varies with the applied voltage difference from the first refractive index to the second refractive index. In one embodiment, a sensor is optically coupled to the layer to produce an output proportional to the light in the layer. It is preferred that a controller receives the sensor output and controls a voltage difference to the electrodes. In another embodiment, the first material is on a substrate. One of the pair of electrodes is between the substrate and first material, and the other of the pair of electrodes is on the layer distal to the core. In yet another embodiment, each of the pair of electrodes are coplanar and parallel with the waveguide, each of the pair of electrodes has an edge, the pair of edges has a spacing, and at least a portion of the EO material is between the pair of edges. The spacing may be either constant or can be regularly repeated along the waveguide.

In a further aspect of the present invention, an array of variable optical attenuators is provided that is more reliable and less expensive than those of the prior art.

BRIEF DESCRIPTION OF THE DRAWINGS

The foregoing aspects and the attendant advantages of this invention will become more readily apparent by reference to the following detailed description when taken in conjunction with the accompanying drawings wherein:

FIGS. 13A and 13B are planar sectional views 13—13 of FIG. 12A showing a first electrode embodiment and a second embodiment, respectively.

Reference symbols are used in the Figures to indicate certain components, aspects or features shown therein, with reference symbols common to more than one Figure indicating like components, aspects or features shown therein.

DETAILED DESCRIPTION OF THE INVENTION

The present invention is directed to a VOA that overcomes the problems associated with currently available VOAs. For example, VOAs provided in accordance with the present invention are faster than current VOAs, can be manufactured in closely packed arrays, and are readily amenable to monitoring of the attenuation. They are thus readily usable in WDM networks. More specifically, a VOA according to the present invention provides attenuation by controlling the leakage of light from the core of a waveguide into an optically-coupled layer. This layer is sometimes referred to herein at a "drain layer." By selection of the optical properties of the drain layer, attenuation is enhanced and the leaked light is confined to the layer, facilitating monitoring of light attenuated from an input signal.

Figure 1:
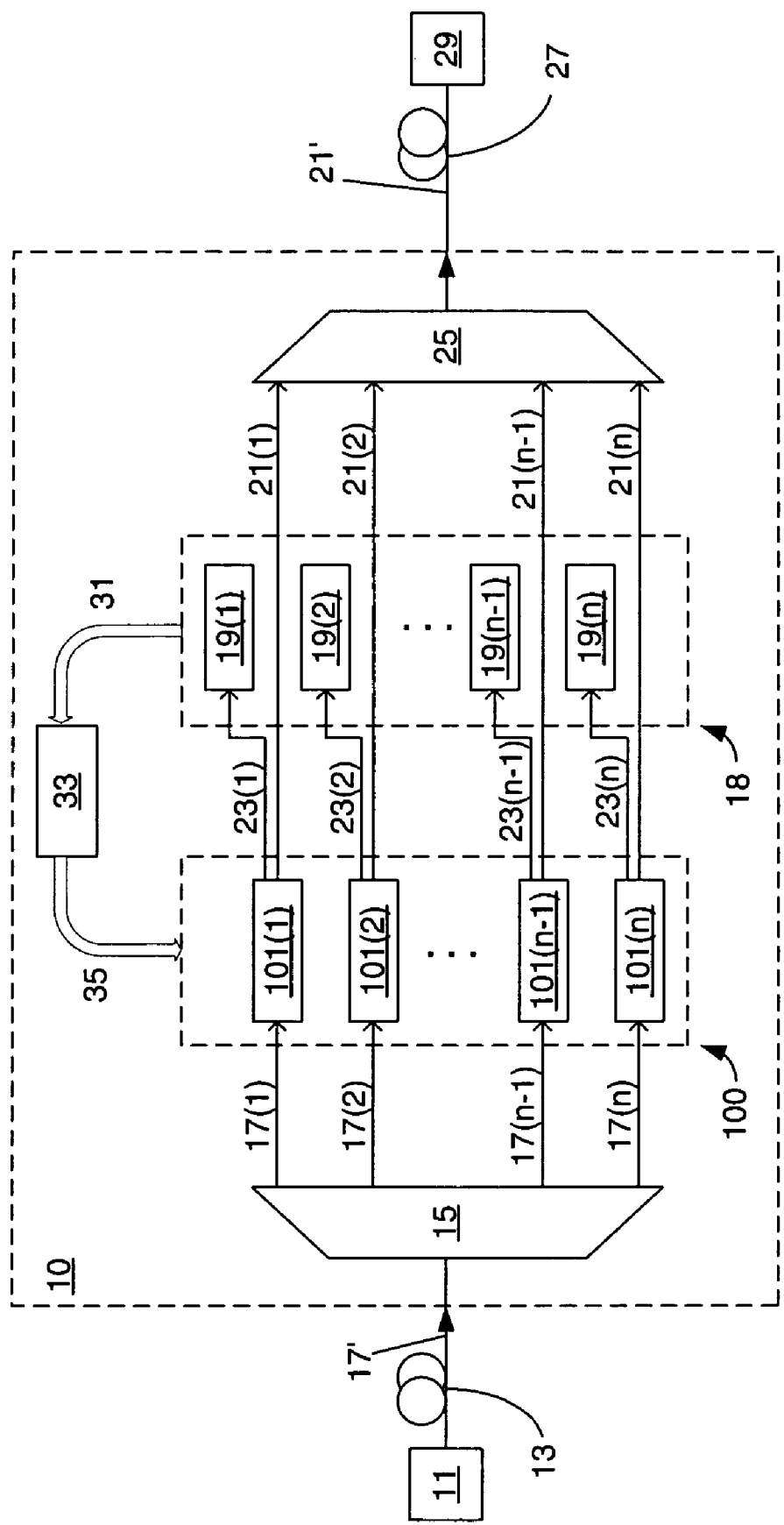
FIG. 1 is a schematic of an array of VOAs and corresponding power meters of the present invention as used in a gain equalizer of a WDM network.

FIG. 1 is a schematic of an array of VOAs 100 and an array of intensity monitors, or power meters 18 of the present invention as used in a gain equalizer 10 of a WDM network. In addition to VOA array 100 and intensity meter array 18, gain equalizer 10 includes a demultiplexer array (DMUX) 15, a multiplexer (MUX) 25, and a controller 33. Gain equalizer 10 accepts a WDM signal 17' from a source 11 provided by a fiber 13, and separately adjusts the intensity of each WDM signal to produce an equalized signal 21' that is then transmitted through a fiber 27 to a WDM signal receiver 29.

Using WDM each signal, such as signal 17' and signal 21', contains 2 or more individual signals or channels. The number of channels is indicated herein as "n," where n is a number equal to or greater than 2. Individual ones of signal 17' are denoted, in general, as signal 17, as one of signals 17(1), 17(2), ..., 17(n), or in reference to one of signal 17(m), where m is a generalized index. Individual ones of signal 21' are denoted by a similar reference to signal 21, one of signals 21(1), 21(2), ..., 21(n), or by reference to index m, as in signal 21(m).

Gain equalizer 10 adjusts the intensity of signal 17' to form signal 21' as follows. DMUX 15 accepts a WDM signal 17' and separates the WDM signal into the n separate signals 17. VOA array 100 includes n separate VOAs corresponding to each WDM channel, specifically VOA 101(1), VOA 101(2), . . . , VOA 101(n). Individual ones of the array of VOAs are referred to herein as VOA 101, or by a number other than n, for example the $m^{th}$ VOA is referred to as VOA 101(m).

As described subsequently, VOA 101 accepts signal 17 and produces two optical outputs: equalized signal 21 and a monitor signal 23. Using the numbering convention introduced above, the n monitor signals 23 are referred to as one of monitor signal 23(1), 23(2), . . . , 23(n). VOA array 100 also includes an array of intensity monitors 18 that includes n separate intensity monitors 19(1), 19(2), . . . , 19(n), or in general, intensity monitor 19. As described subsequently, each intensity monitor 19 accepts a monitor signal 23 and produces an electrical signal 31 that is proportional to the intensity of the monitor signal. Controller 33 accepts electrical signal 31 from each of the n channels, calculates a correction to be applied to the attenuation of the corresponding signal 17 within VOA 101, and provides a correction signal 35 to that VOA. In one embodiment, each channel is attenuated independently from one another according to the monitored signal of that channel. In another embodiment, one or more channels are attenuated using information from other channels. Thus for example, one of the channels provides known intensity levels to calibrate VOA array 100. MUX 25 then recombines the n equalized signals 23 into equalized WDM signal 21'. Multiplexers and demultiplexers are known in the art, and can include, for example, an array waveguide grating (AWG) or thin-film filters.

Figure 2:
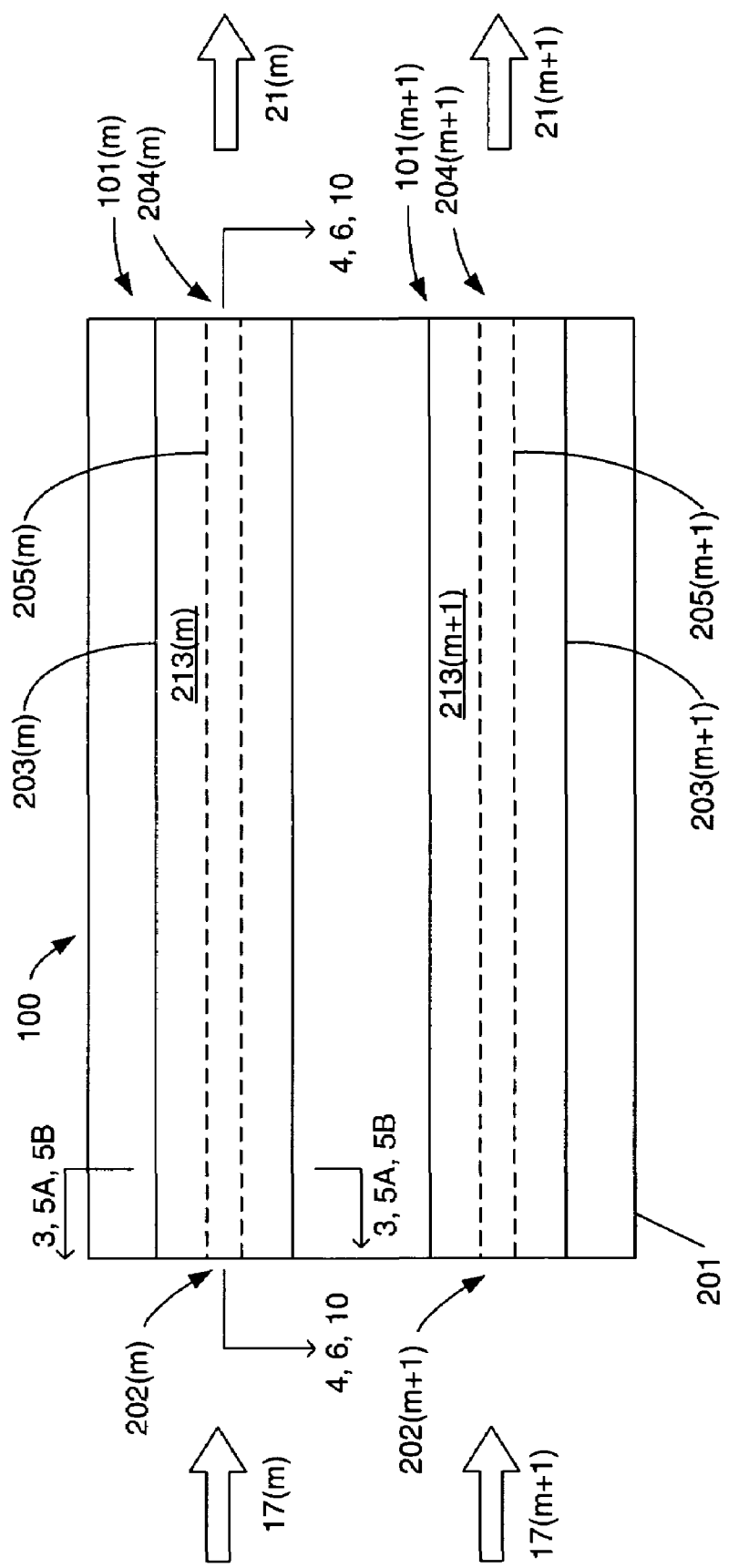
FIG. 2 is a top schematic view of two first embodiment VOAs of the present invention.
Figure 3:
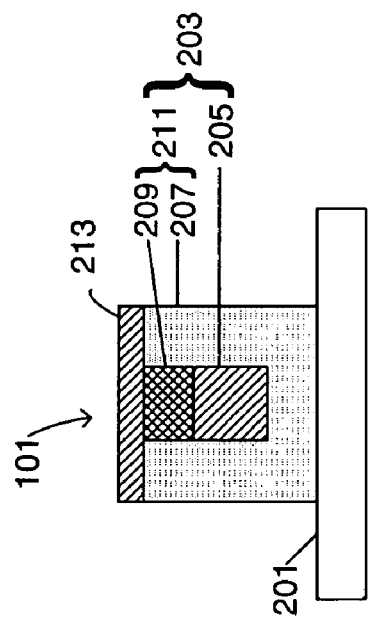
FIG. 3 is an end sectional view 3—3 of FIG. 2.
Figure 4:
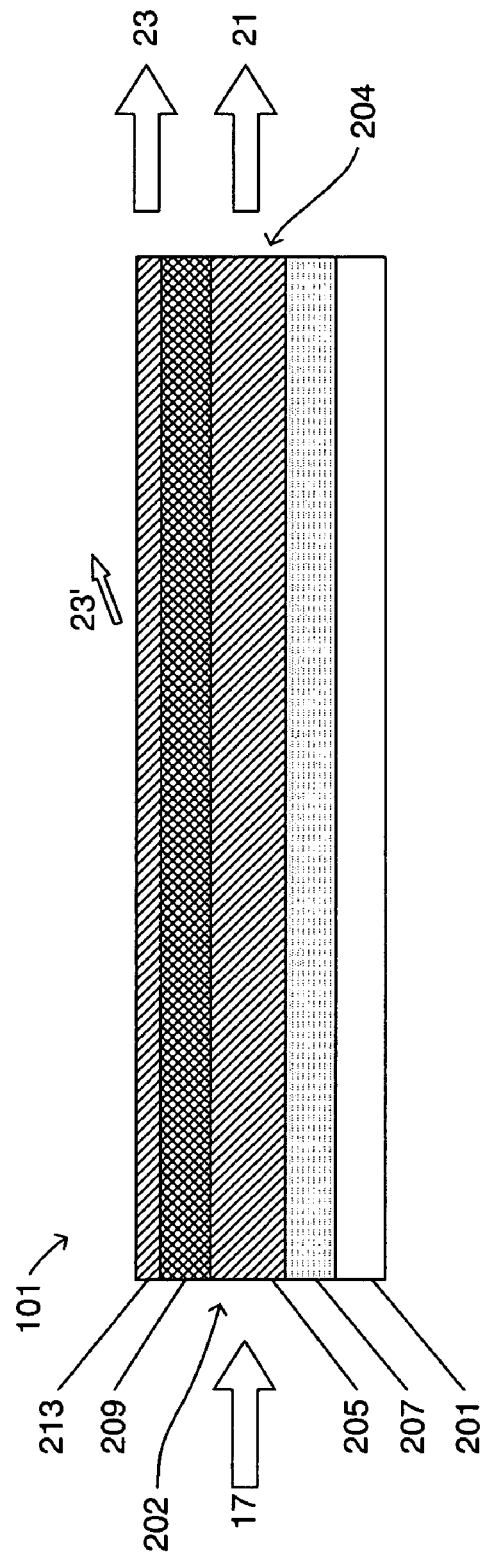
FIG. 4 is a lateral sectional view 4—4 of FIG. 2.

A schematic of the VOA array 100 of the present invention is presented in FIGS. 2, 3, and 4, where FIG. 2 is a top schematic view of two first embodiment VOAs 100 of the present invention formed on a substrate 201, FIG. 3 is an end sectional view 3—3 of FIG. 2, and FIG. 4 is a lateral sectional view 4—4 of FIG. 2. FIGS. 2, 3, and 4 are illustrative and as such highlight some aspects of the present invention. As will be apparent from the discussion of this and other embodiment, there are many materials and configuration that are within the scope of the present invention, which is not limited by the embodiments presented herein.

FIG. 2 shows two representative and adjacent VOAs as VOA 101(m) and 101(m+1). Each VOA 101 extends from an input 202 that is optically coupled to DMUX 15 for accepting signal 17 and to an output 204 that is coupled to MUX 25 for providing equalized signal 21. As shown in FIGS. 3 and 4, each VOA 101 includes a drain layer 213 and a waveguide 203 that includes a core 205 and a surrounding cladding 211. The optical properties of core 205, cladding 211, and drain layer 213 are selected such that the attenuation of light between input 202 and output 204 can be controlled, as described subsequently.

The attenuation of light through core 205 is achieved by propagating light through the core while modifying the refractive index (R.I.) of cladding 211 between core 205 and drain layer 213. The light attenuated from core 205 is coupled to drain layer 213 according to the modified R.I. of cladding 211. A preferred, refractive index modifiable material to form all or part of cladding 211 is an EO material. As is known in the art, these materials have a R.I. that varies with the electric field within the material. The electro-optic effect is intrinsically very fast, resulting from atomic level changes to the EO material. These changes can occur with speeds on the order of several nanoseconds. The operational speed of VOA 101 can be as fast as from about 1 to about 500 nanoseconds.

In the present invention, electrodes are provided in the vicinity of an EO material of the waveguide cladding to produce a change in R.I. according to the voltage difference applied to electrodes (shown in FIGS. 5A and 5B) that are located on opposite sides of, or near, cladding 211 between core 205 and drain layer 213. It is preferred that with little or no applied voltage to the electrodes of VOA 101, waveguide 203 is a low-loss waveguide, and that when a voltage is applied to the electrodes of the VOA that the losses through the waveguide increase, with a substantial amount of the light attenuated from the VOA being directed into drain layer 213.

While the selection of optical properties is discussed subsequently, it is preferred, though not necessary, that the material properties and dimensions are selected so that (1) when no voltage difference is applied across the electrodes of the VOA, cladding 211 has a uniform R.I. that efficiently permits transmission of light through the VOA, and (2) when a voltage difference is applied across the electrodes of the VOA, an electric field is established that affects the R.I. of cladding 209 between core 205 and drain layer 213, coupling light from the core into the drain layer. The fraction of light entering input 202 that emerges from output 204 can be controlled according to the voltage difference applied to the electrodes. The control of the light signal through VOA 201 is thus achieved by modifying the R.I. of electro-optic layer 209 by the application of an electric field to the layer, for example, according to a voltage difference applied across layer 209, as discussed subsequently. Since the light attenuated from VOA 201 is coupled into drain layer 213, the light attenuated from the VOA is not scattered back towards core 205, and can be conveniently sampled from the layer and can be used to control the VOA, as described subsequently.

More specifically, cladding 211 includes a first cladding 207 and a second cladding 209. The R.I. of second cladding 209 is adjustable, as described below, while the refractive indices of core 205, first cladding 207, and drain layer 213 are relatively constant, or much less variable than the R.I. of the second cladding. Alternatively, cladding 207 and 209 can both be formed from an EO material. As in known in the art, the R.I. of the EO material of cladding 209 can be modified continuously and controllably. The control of R.I. allows the inventive VOA to controllably attenuate the light between input 202 and output 204.

It is preferred that core 205 and drain layer 213 have the same R.I., and that cladding 207 has a lower R.I. Cladding 209 is formed from an EO material that, by the application of a suitable electric field, has an R.I. that can be varied between the R.I. of core 205 and drain layer 213 and the R.I. of cladding 207. It is also preferred that, in the absence of an electric field (when the electrodes are "unpowered"), the refractive indices of cladding 209 and cladding 207 are the same, resulting in an attenuation across VOA 101 that is small, for example on the order of 0 dB, and that, in the presence of an electric field (when the electrodes are "powered"), the R.I. of cladding 209 is equal to the R.I. of core 205 and drain layer 213, resulting in an attenuation across the VOA that is larger, for example, as much as 15 dB/cm.

Waveguide 203 thus has a small attenuation when VOA 101 is unpowered, and an increasing attenuation with increased power input. The portion of light from input 202 that does not reach output 204 is referred to herein as the "leaked" light (the light has leaked from waveguide 203). The leaked light preferentially propagates through drain layer 213 and emerges near output 204 as monitor signal 23. Although signal 23 is shown propagating in the direction of waveguide 203, it is understood that some of the light may propagate away from the waveguide, shown schematically as light ray 23'. Monitor signal 23 is thus some fraction of the light attenuated from signal 17.

Figure 5A:
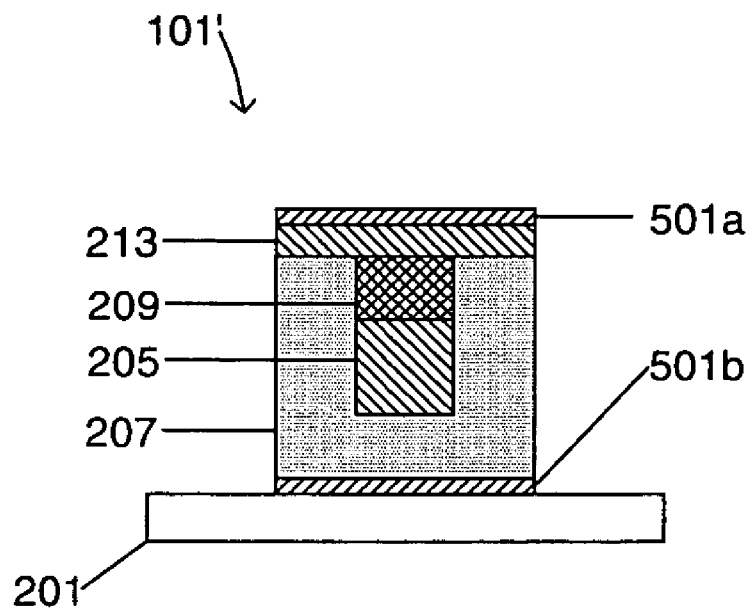
FIGS. 5A and 5B are sectional views 5A—5A and 5B—5B, respectively, of FIG. 2 illustrating alternative embodiments for VOA electrodes.
Figure 5B:
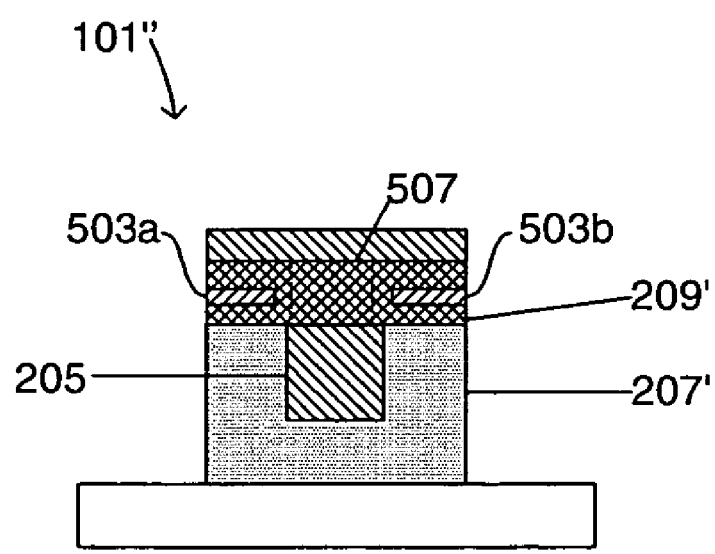

Two embodiments of cladding 211 and electrodes for inducing changes in the R.I. of EO material of cladding 211 are illustrated in FIGS. 5A and 5B as sectional views 5A—5A and 5B—5B, respectively, of FIG. 2. In the embodiments of FIGS. 5A and 5B, core 205 and drain layer 213 optical polymers having a R.I. of 1.567, and cladding 207 is an optical polymer having a R.I. of 1.563. Cladding 209 is an EO material having a R.I. of 1.563 in the absence of an electric field and a R.I. of 1.567 at some maximum voltage difference between the electrodes.

FIG. 5A shows a VOA 101' having an electrode 501a on top of drain layer 213 and an electrode 501b between substrate 201 and cladding 207. Electrodes 501a and 501b extend the length of VOA 101', and cladding 209 is confined in the region between core 205 and drain layer 213. The application of a voltage difference between electrodes 501a and 501b produces an electric field within the EO material of second cladding 209 that increases the R.I. of the second cladding.

FIG. 5B shows a VOA 101" having a first cladding 207' that extends to the top of core 205 and a second cladding 209' that extends from the core and first cladding to drain layer 213. Second cladding 209' has a first electrode 503a and a second electrode 503b embedded within the second cladding. Electrodes 503a and 503b extend the length of VOA 101", and cladding 209 is confined in the region between core 205 and drain layer 213. The gap between electrodes 503a and 503b produces an electric field, and thus a change in R.I. of the EO material of cladding 209, within region 507. In addition, the gap between electrodes 503a and 503b form an aperture between core 205 and drain layer 213 to allow light attenuated from the core propagate into the layer. It is thus seen that it is the combination of the EO material and the placement of the electrodes that modifies the R.I. of the cladding in the region between core 205 and drain layer 213 and optically couples the core and drain layer.

Figure 14A:
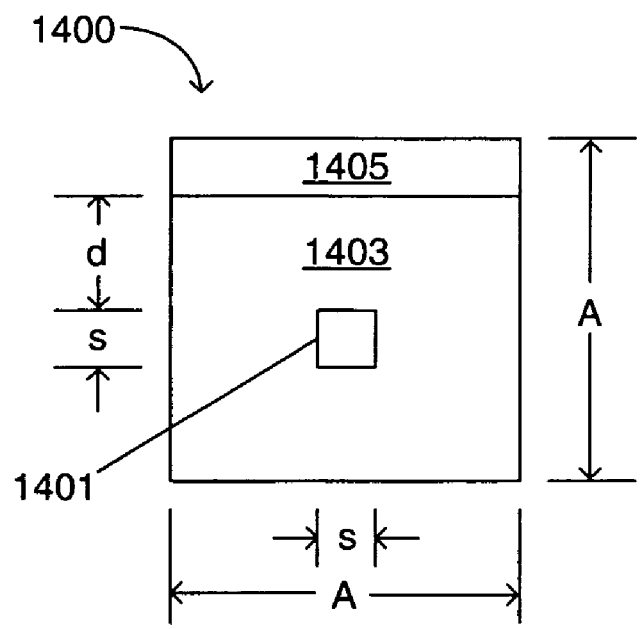
FIG. 14A is a cross-sectional view of a first domain of materials used in a computer simulation of a VOA.
Figure 15A:
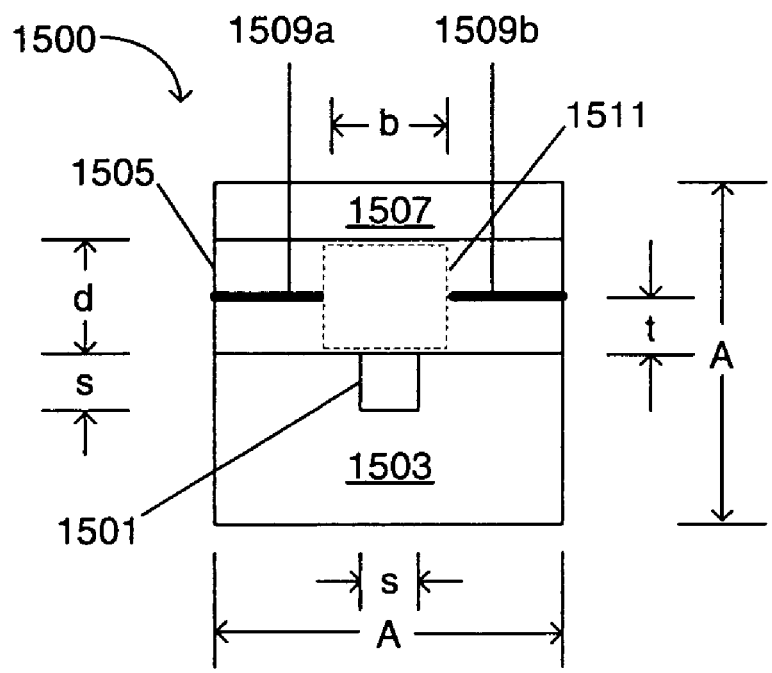
FIG. 15A is a cross-sectional view of a second domain of materials used in a computer simulation of a VOA.
Figure 14B:
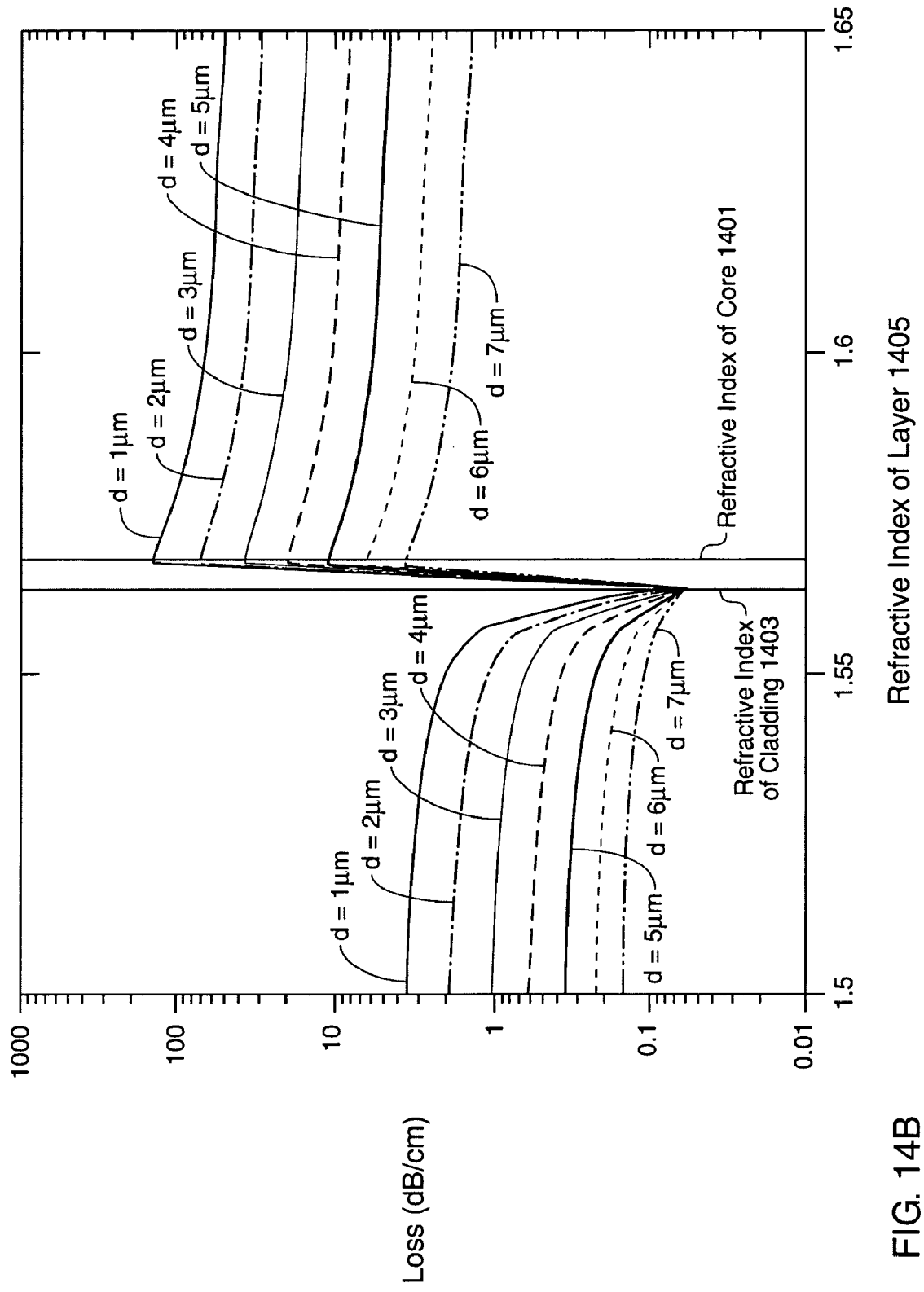
FIG. 14B is a graph showing the results of calculations using the domain of FIG. 14A, illustrating the loss of optical power as a function of the cladding height and the refractive index of the drain layer.
Figure 15B:
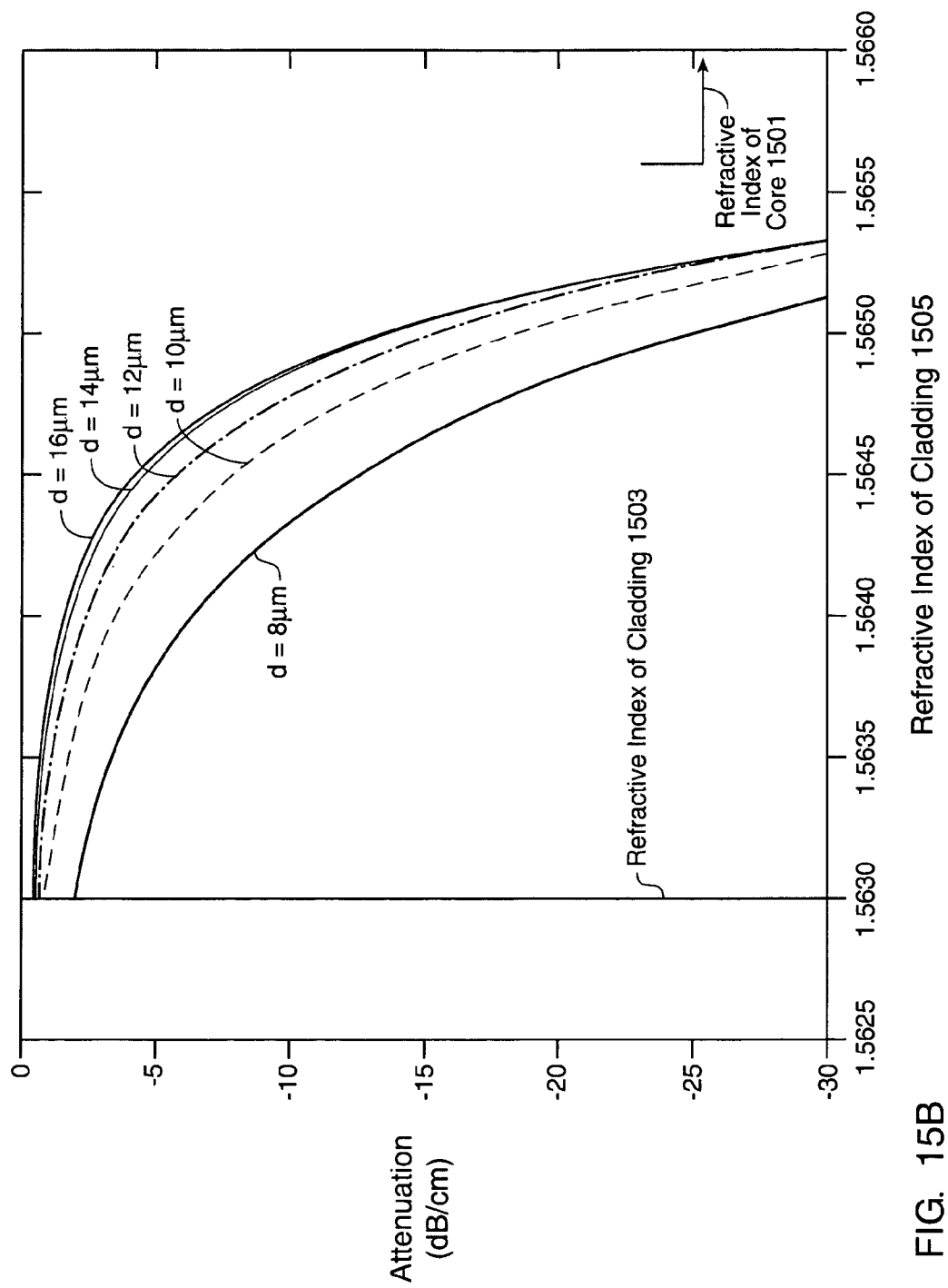
FIG. 15B is a graph showing the results of calculations using the domain of FIG. 15B, illustrating the attenuation in a waveguide as a function of the cladding height and refractive index.

Computer simulations of simplified VOA structures illustrate the effect of R.I. and dimensions of the VOA on attenuation. These results are presented in FIGS. 14A–15B as the loss or attenuation of optical power, in dB/cm of waveguide length, as a function of various design parameters. FIGS. 14A and 15A are cross-sectional views, similar to view 3—3 of FIG. 2, of two simulation computational domains, and FIGS. 14B and 15B are corresponding graphs showing the results of simulations of the propagation of 1.550 μm light. FIG. 14A shows a first domain 1400 having a core 1401, a cladding 1403, and a drain layer 1405. For the results presented in FIG. 14B, core 1401 has a R.I. of 1.567 and has a square cross section of s=7 μm on a side and is surrounded by cladding 1403 having a R.I. of 1.563. Cladding 1403 extends a height d from core 1401 to drain layer 1405. The total height and width of the simulation is A=50 μm on a side centered about core 1401.

FIG. 14B shows the loss of optical power as a function of the height d of cladding 1403 and the R.I. of drain layer 1405. The entire cladding 1403 has the same R.I., and thus these calculations represent the loss from an unpowered VOA. For each value of d presented in FIG. 14B, the loss of optical power is a minimum when the R.I. of drain layer 1405 is the same as the R.I. of cladding 1403—that is drain layer 1405 acts as additional cladding when the R.I. of the drain layer matches that of the cladding. In addition, for each value of d, the loss is a maximum when the R.I. of drain layer 1405 is the same as the R.I. of core 1401 due, in part, to optical coupling of the core and drain layer. Also, a reduction in d for any value of drain layer 1405 R.I. is a reduction in cladding thickness that increases the loss of optical power.

FIG. 15A shows a computational domain 1500 having a core 1501, a lower cladding 1503, an upper 1505 having embedded electrodes 1509a and 1509b, and a drain layer 1507. For the results presented in FIG. 15B, core 1501 has a R.I. of 1.567 and has a square cross section of s=7 μm on a side and is surrounded on one side by lower cladding 1503 having a R.I. of 1.563 and on another side by upper cladding 1505. Upper cladding 1505 has a variable height d and variable R.I. Electrodes 1509a and 1509b have a separation of b of 20 μm and are located a height t=4 μm from the interface between lower cladding 1503 and upper cladding 1505. The application of a voltage difference between electrodes 1509a and 1509b is simulated by modifying the R.I. region 1511. The total height and width of the simulation is A=50 μm on a side.

FIG. 15B shows that the attenuation depends on d and on the R.I. of cladding 1505, with an increased attenuation for smaller values of d and at values of the R.I. of the cladding approaching the R.I. of core 1501.

Figure 17:
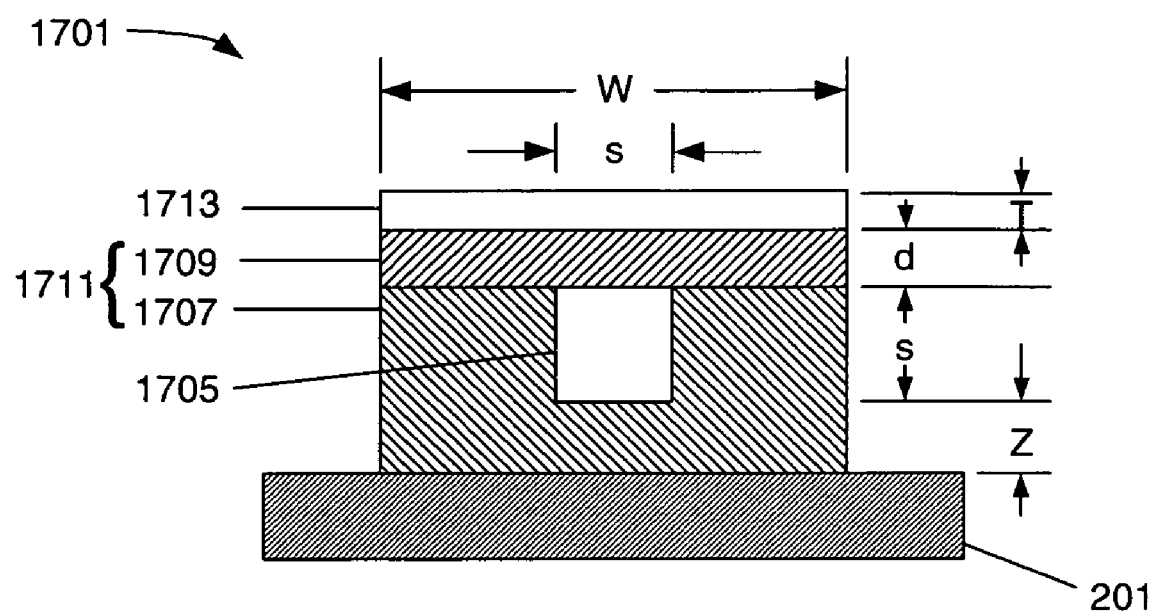
FIG. 17 shows the dimensions for one embodiment VOA for 1550 μm light.

The results of FIGS. 14B and 15B indicate that there is a trade-off in loss and attenuation with several design parameters. Specifically, the results show that the coupling of light out of an unpowered VOA 101 is greatest when the core and drain layer have the same R.I. and when the thickness of the cladding between the core and drain layer is smallest, and that by changing the refractive index of the cladding that the attenuation can be varied. FIG. 17 shows the dimensions for one embodiment for a VOA 1701 of the present invention having core 1705, a cladding 1711 including a first cladding 1707 and a second cladding 1709, and a drain layer 1713. In addition, VOA 1701 has electrodes disposed about second cladding 1709 that are not shown, but which were discussed with reference to FIGS. 5A and 5B, and are discussed in detail subsequently. In the preferred embodiment, core 1705 has a R.I. of 1.567 and has a square cross section of s=7 μm on a side and is surrounded on the bottom and sides by first cladding 1707 and on top by second cladding 1709. First cladding 1707 has a R.I. of 1.563 and extends a distance Z below core 1705, where Z is from 5 μm to 20 μm, preferably about 15 μm. Second cladding 1709 extends a distance Y from core 1705 to layer 1713, and includes an EO material with a R.I. that can be varied from 1.563 to 1.567 as the voltage difference across the electrodes is increased from zero to some maximum value. The value of Y is from 5 μm to 20 μm, preferably about 8 μm. Layer 1713 preferably has the same R.I. as core 1705, and has a height T that is from 1 μm to 10 μm, or more preferably from 3 μm to 5 μm. VOA 1701 has a width W that is 30 μm or larger, preferably about 250 μm.

Figure 18:
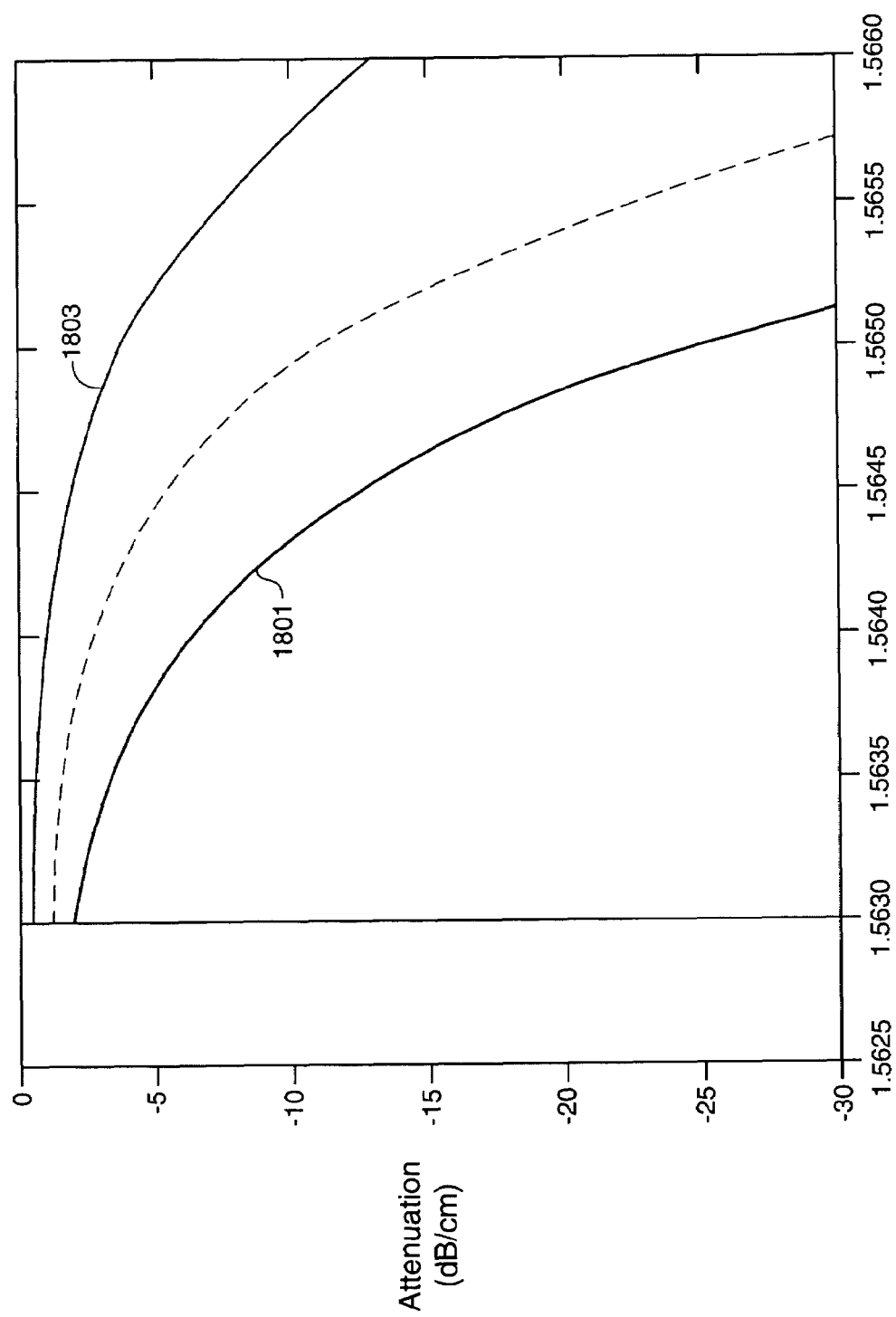
FIG. 18 shows the effect of the R.I. of the drain layer on attenuation for two values of drain layer refractive index.

FIG. 18 is a graph which shows the effect of the R.I. of layer 1713 on attenuation, where the attenuation as a function of the R.I. of cladding 1709 is shown in curve 1801 for a R.I. of layer 1713 having the same value as the R.I. of core 1705, and in curve 1802 for a R.I. of layer 1713 having the same value as the R.I. of cladding 1707. FIG. 18 illustrates that a waveguide having equal layer 1713 and core 1705 refractive indices has a higher attenuation at the same R.I. of cladding 1709. The R.I. of layer 1713 is thus effective at improving the performance of the VOA.

Figure 6:
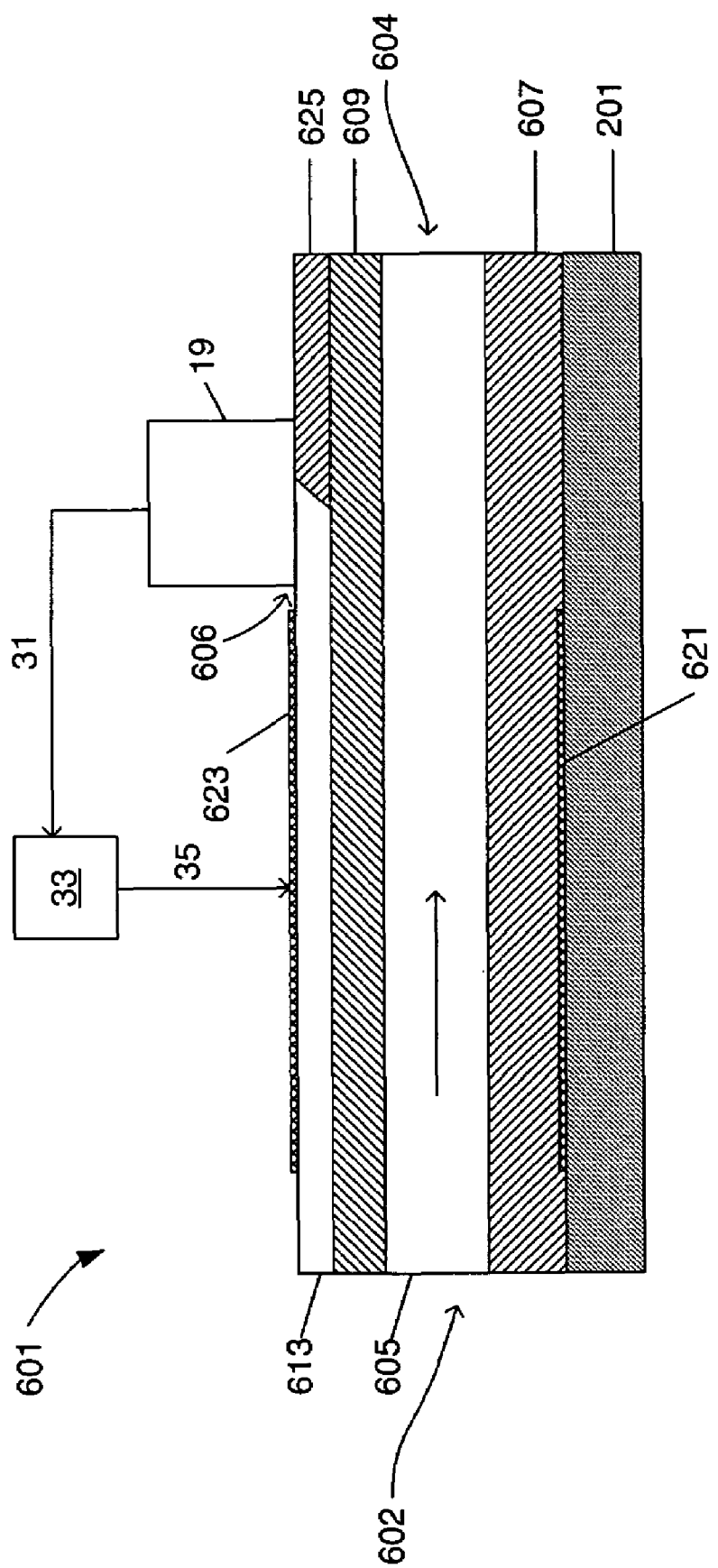
FIG. 6 is a sectional side view, indicated as view 6—6 of top schematic view FIG. 2, showing one VOA and power meter of a second embodiment array of VOAs and power meters of the present invention.
Figure 7:
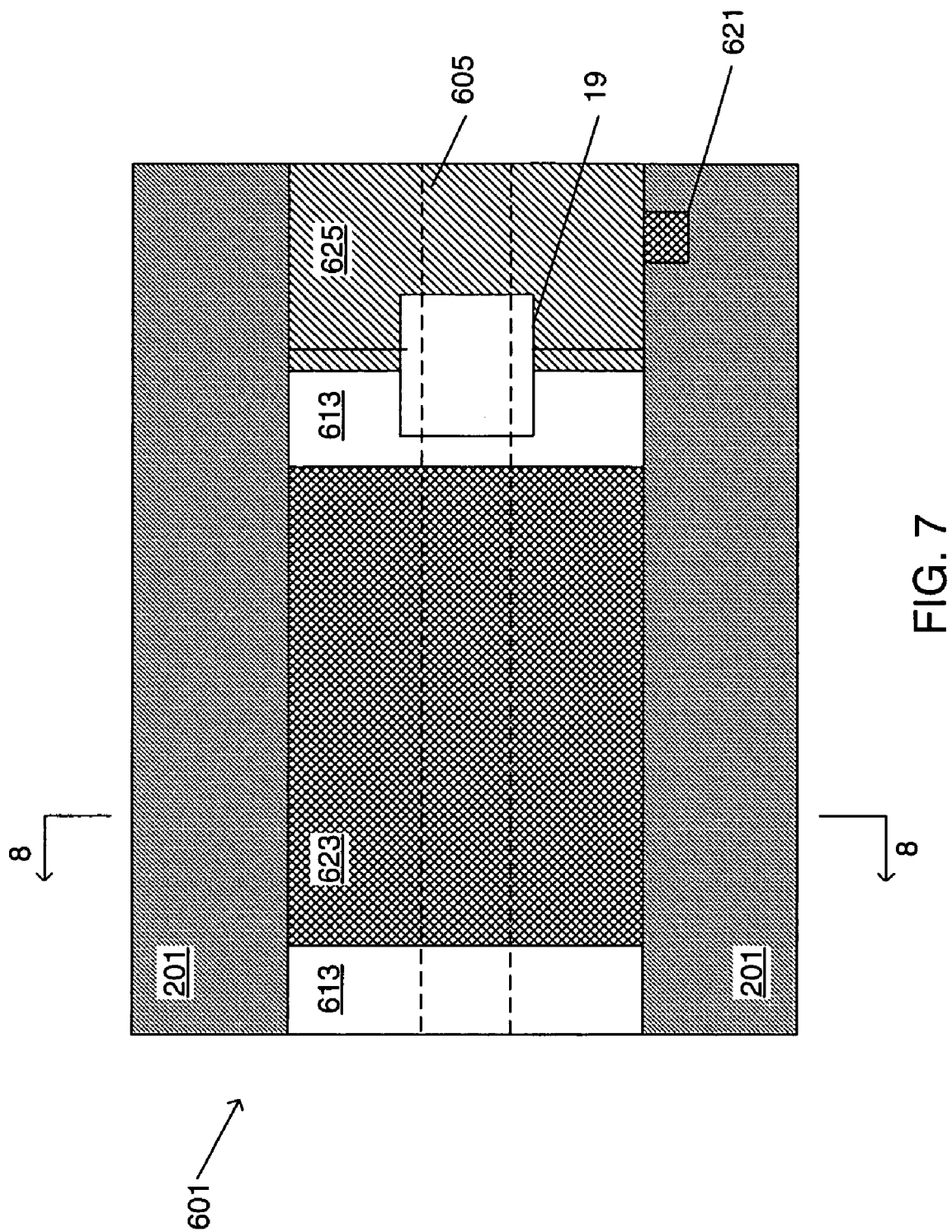
FIG. 7 is a top view of one of the second embodiment VOAs and corresponding power meter of an array of VOAs and power meters of the present invention.
Figure 8:
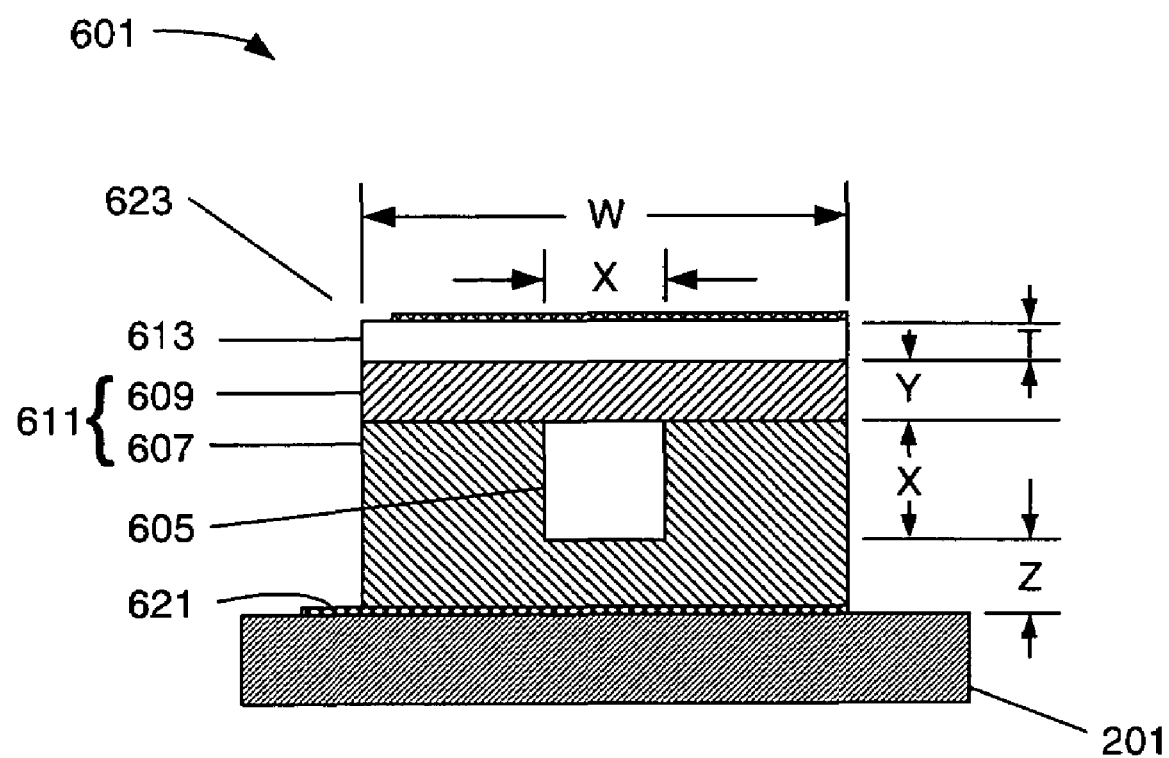
FIG. 8 is a sectional side end view 8—8 of FIG. 7.

A second embodiment VOA 601 and a corresponding power meter 19 is shown in FIGS. 6–8, where FIG. 6 is a sectional side view 6—6 of FIG. 2, FIG. 7 is a top view, and FIG. 8 is a sectional side end view 8—8 of FIG. 7. Each VOA 601 has an input 602 to accept a light input 17, an output 604 to provide a signal 21, and a monitor output 606 to provide a monitor signal 23. VOA 601 includes a waveguide core 605 from the input to the output that is surrounded by a cladding 611, a drain layer 613 on top of cladding 611, and a first electrode 621 between cladding 611 and substrate 201 and a second electrode 623 on top of a layer 613 that includes the monitor output. Cladding 611 includes a first cladding 607 and a second, EO cladding 609. Specifically, EO cladding 609 is formed from an EO material, and first cladding 607, core 605, and layer 613 are formed from materials that are not EO. Input 602 and output 604 correspond to the ends of core 605, where light is coupled into the core and out of the core, respectively, preferably by optical fibers (not shown).

The materials of core 605, cladding 611, and layer 613 are optically transparent materials for wavelengths of the WDM signals. The materials of substrate 201 can be, but are not required to be, optically transparent at the WDM wavelengths. The material optical properties and dimensions, as well as the spacing and placement of electrodes 621 and 623, are selected to controllably pass, attenuate, or block light traveling across VOA 601 from input 602 and towards output 604, as indicated by the arrow within core 605 in FIG. 6, according to the electro-optically controllable R.I. of EO cladding 609, as follows. When EO cladding 609 has a R.I. equal to the R.I. of core 605, the dimensions and materials of VOA 601 are such that the core and cladding 611 are a high-loss waveguide between input 602 and output 604. When EO cladding 609 has a R.I. equal to that of cladding 607, the dimensions and materials of VOA 601 are such that core 605 and cladding 611 are a low-loss waveguide of light entering core 605. At R.I. values between that of core 605 and cladding 607, a controllable fraction of the light is transmitted across the variable optical attenuator 601.

Core 605 is preferred to have a cross-sectional shape that is rectangular or square. As shown in the preferred embodiment of FIG. 8, core 605 has a square cross-section with each side having a length X. Cladding 607 has a thickness Z, and EO cladding 609 has a thickness Y. Layer 613 has a thickness T. VOA 601 has a width W that is preferably approximately equal to the height of the VOA (W≈X+Y+Z). Core 605 has a refractive index of R.I. (core), layer 613 has a refractive index R.I. (layer), cladding 607 has a refractive index of R.I. (cladding), and EO cladding 609 is an EO material with a variable refractive index R.I. (E-O) dependent on the applied electric field. The application of voltage difference of $\Delta V$ between electrodes 621 and 623 establishes an electric field of approximately $-\Delta V/S$, where S is the spacing between electrodes 621 and 623 (S=X+Y+Z+T) to which the R.I. of EO cladding 609 is responsive.

In one preferred embodiment, core 601 has a R.I. of 1.567 and has a square cross section of X=7 μm on a side and is surrounded on the bottom and sides by first cladding 607 and on top by EO cladding 609. First cladding 607 has a R.I. of 1.563 that extends a distance Z below core 605, where Z is from 5 μm to 20 μm, preferably about 15 μm. The EO cladding 609 extends a distance Y from core 605 to layer 613, and includes an EO material with a R.I. that can be varied from 1.563 to 1.567 as the voltage difference across the electrodes is increased from zero to a predetermined value. The value of Y is from 5 μm to 20 μm, preferably about 8 μm. Layer 613 preferably has the same R.I. as core 605, and has a height T that is from 1 μm to 10 μm, or more preferably from 3 μm to 5 μm. VOA 601 has a width W that is 30 μm or larger, preferably about 250 μm.

Preferred materials for core 605 and layer 613 include optical polymers, including but not limited to low loss optical epoxies. Preferred materials for cladding 607 are the same as for core 605 with dopants added to modify the cladding R.I. to be slightly lower than that of the core, for example 2% to 10% of another epoxy with a lower R.I. Preferred materials for substrate 601 include, but are not limited to materials typically used in manufacturing of substrate wafers, such as silicon. Preferred materials for EO cladding 609 include materials that have R.I. ranges between those of the core and cladding and have electro-optic coefficients that allow their use with reasonable applied voltages, including but not limited to mixtures of poly-carbonate and a chromophore. Preferred materials for electrodes 621 and 623 are metals that can be deposited using methods compatible with semiconductor manufacturing techniques and with the layers of VOA 601, for example, tungsten, titanium, and copper.

In one embodiment, core 605, layer 613, and cladding 607 are formed from one type of optical polymer, and EO cladding 609 is formed from the same or a similar polymer with additives, including but not limited to poly-carbonate and a chromophore, that make the polymer electro-optic. The operation of VOA 101 with these materials requires an electric field on the order of about 1 to about 100 V/μm for appropriate modification of the R.I. Preferred electrode spacing to produce his electric field are from about 5 to about 20 μm, with a preferred voltage difference of about 10 to about 100 volts.

Figure 9:
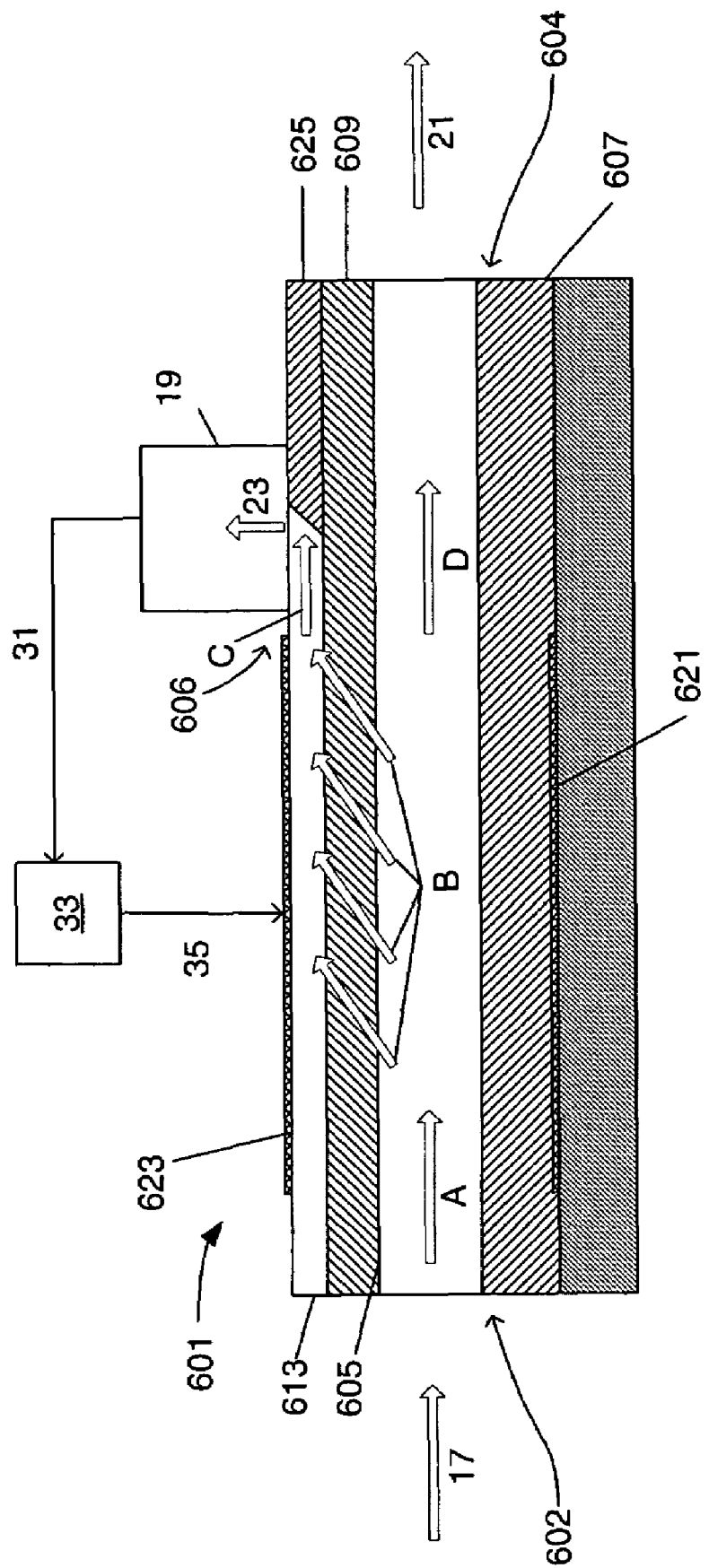
FIG. 9 is a sectional side view showing some operational features of the second embodiment VOA and power meter of the present invention.

FIG. 9 is a sectional side view showing some operational features of the second embodiment VOA 601 and corresponding power meter 19 of the present invention, depicting rays A, B, C, and D which illustrate the propagation or deflection of light through the VOA. As described previously, the application of a voltage difference $\Delta V$ between electrodes 621 and 623 modifies the R.I. of EO cladding 609 to the value away from that of cladding 607 and towards the R.I. of core 605 and layer 613. Under these conditions a fraction of the light propagating through core 605 is coupled out of the waveguide according to the difference in value of the refractive indices. Light as ray A is provided to VOA 601 at input 202. With $\Delta V=0$ volts, the R.I. of EO cladding 609 is the same as that of cladding 607, and the majority of input light propagates within in core 605 to output 204, as indicated schematically as the output of light by ray D.

When the R.I. of EO cladding 609 is the same as that of core 605, light "leaks" from the core, through EO cladding 609, and into layer 613. As indicated by rays B and C, light first propagates into that portion of cladding 609 having the electro-optically modified R.I. A layer 625 that is coplanar with layer 613, has a R.I. different from layer 613, and has an angled surface 629 having a layer of vaporized gold, for example, directs light of ray C 90 degrees through monitor output 606 as monitor signal 23 towards intensity monitor 19. Intensity monitor 19 responds to the intensity of light in monitor signal 23 as electrical signal 31 which is provide to controller 33. Controller 33 in turn provides voltages to one or both of electrodes 621 and 623, thereby controlling the amount of attenuation of VOA 101. Controller 33 can supply different voltages to different ones of VOAs 101 to control the gain of individual WDM signal channels.

In one embodiment, power meter 19 includes a Indium Gallium Arsenide (InGaAs) PIN photodiodes mounted to accept signal 23. Power meter 19 can be mounted, for example, using flip-chip bonding technology with either gold or gold-tin bumps.

Figure 10:
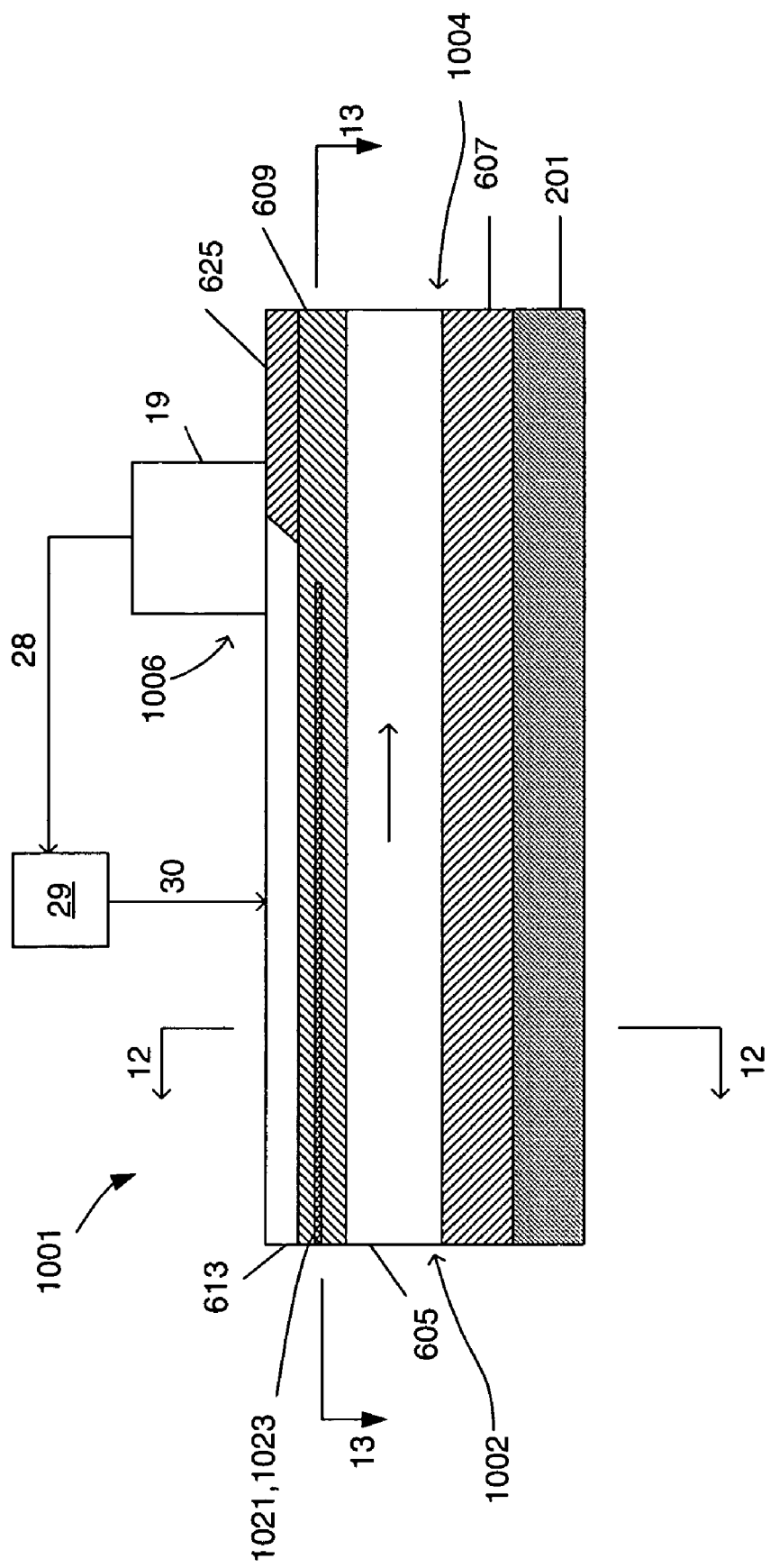
FIG. 10 is a sectional side view, indicated as view 10—10 of top schematic view FIG. 3, showing one VOA and power meter of a third embodiment array of VOAs and power meters of the present invention.
Figure 11:
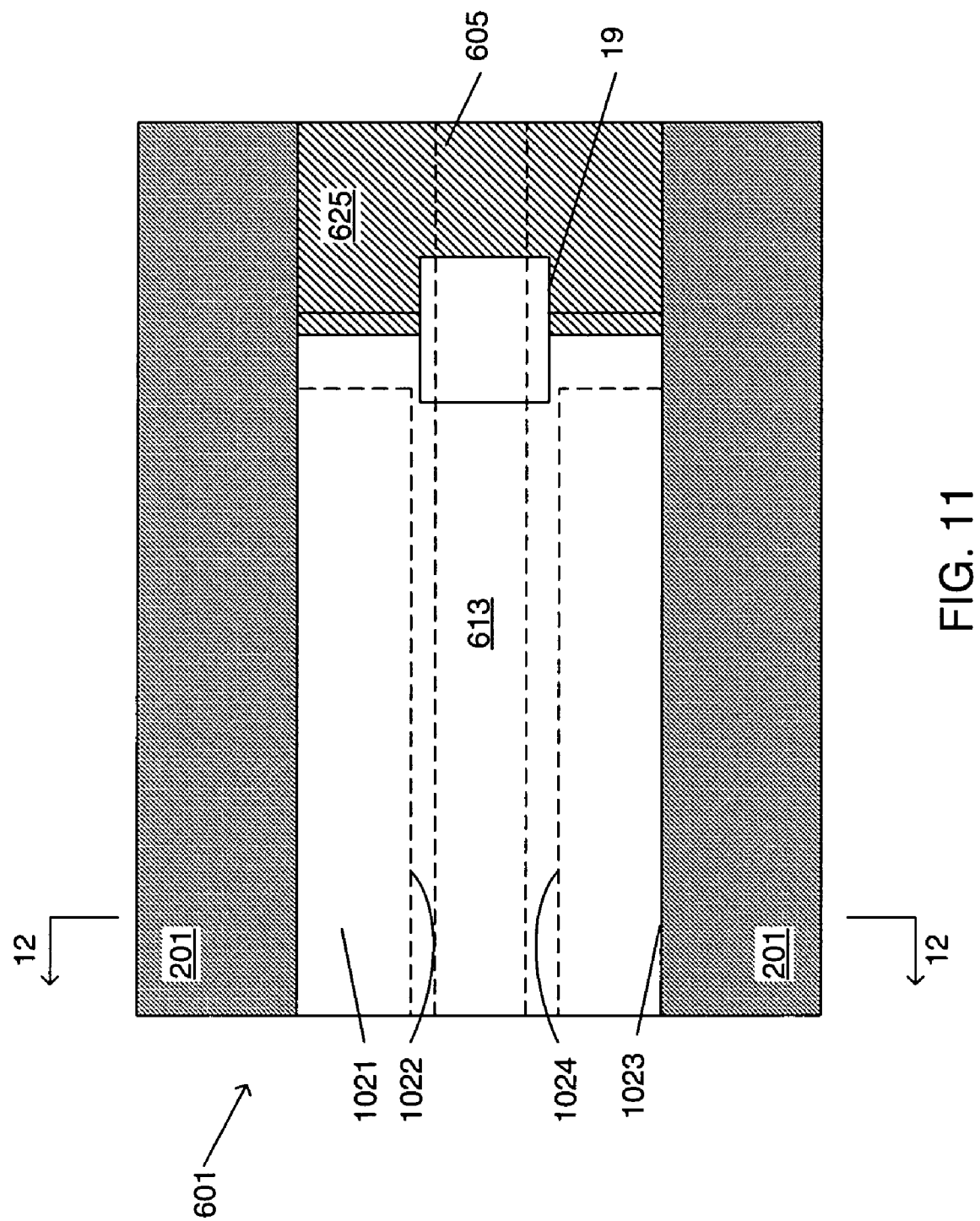
FIG. 11 is a top view of one of the third embodiment VOAs and corresponding power meter of an array of VOAs and power meters of the present invention.
Figure 12A:
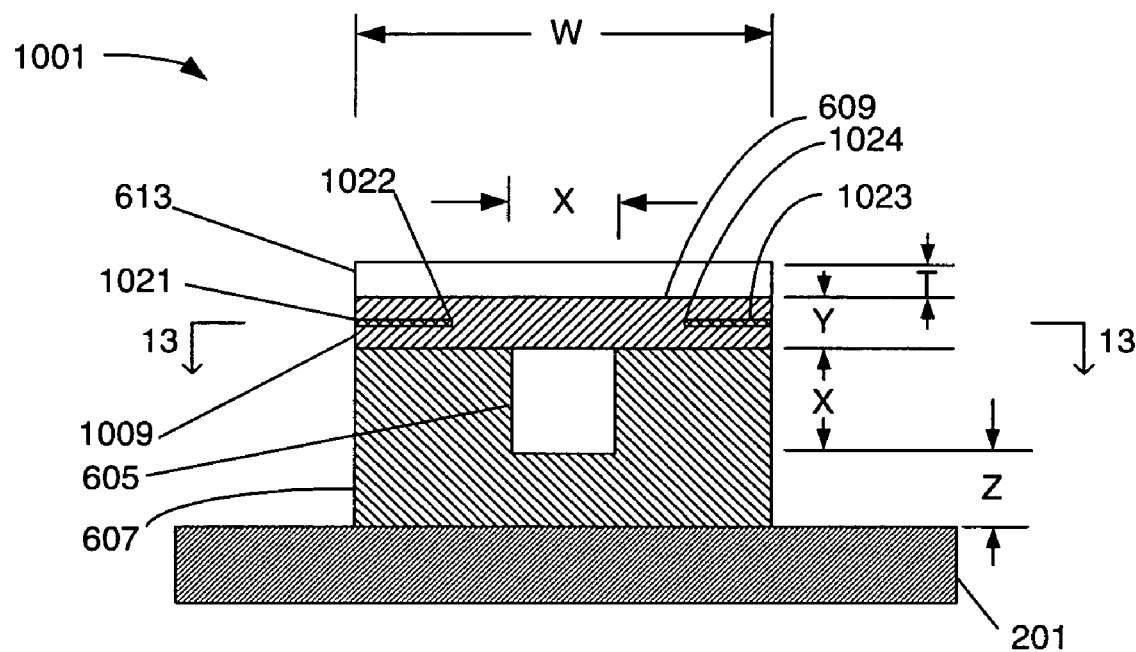
FIG. 12A is a sectional side end view 12—12 of FIG. 11.

A third embodiment VOA 1001 as a corresponding power meter 19 is shown in FIGS. 10–13, where FIG. 10 is a sectional side view 10—10 of FIG. 2, FIG. 11 is a top view, FIG. 12A is a sectional side end view 12—12 of FIG. 11, and FIG. 13A is a planar sectional view 13—13 of FIG. 12A showing the electrode configuration. Each VOA 1001 has an input 1002 for accepting a light signal 17, an output 1004 to provide a signal 21, and a monitor output 1006 for providing a monitor signal 23. VOA 1001 includes core 605, cladding 607 and EO cladding 609, layer 613 layer 625. One difference in between the second embodiment VOA 601 and the third embodiment VOA 1001, is in the placement of the electrodes. Specifically, VOA 1001 has a first electrode 1021 and second electrode 1023 within the EO material of cladding 609. As is best shown in FIGS. 12A and 13A, electrodes 1021 and 1023 present mutually opposing edges 1022 and 1024, respectively. When electrodes 1021 and 1023 have an imposed voltage difference, an electric field is established within EO cladding 609 between edges 1022 and 1024, which modifies the R.I. of the cladding between core 605 and layer 612. Edges 1022 and 1024 also form an aperture between core 605 and layer 613, permitting light leaked from the core to propagate through EO cladding 609 to layer 613.

Figure 12B:
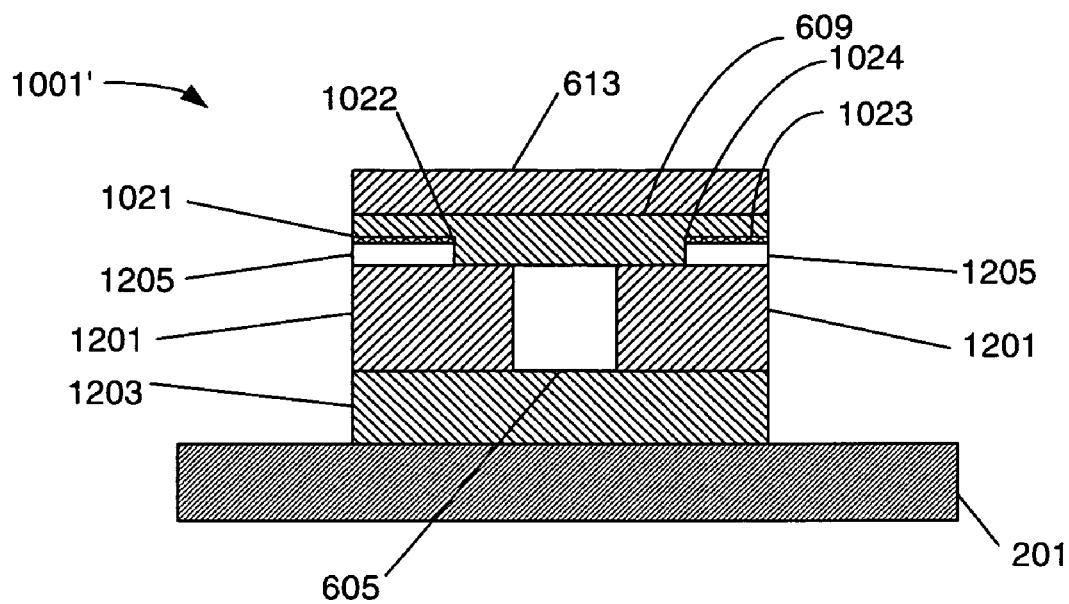
FIG. 12B is a sectional side end view 12—12 of an alternative embodiment of FIG. 11.

It is important that the material between edges 1022 and 1024 include the EO material through which light can propagate into layer 613. FIG. 12B is a sectional side end view 12—12 of an alternative embodiment VOA 1001' of FIG. 11, where electrodes 1021 and 1023 are formed on a material 1205, and where EO cladding 609 fills the space between edges 1022 and 1024 and above electrodes 1021 and 1023. In addition, cladding 607 of VOA 1001 is formed from an under cladding 1203 between core 605 and substrate 201, and a side cladding 1201. It is preferred that the materials of claddings 1201 and 1203 are the same as cladding 1203. Having an under cladding 1203 that protrudes only to the bottom of core 605 may be performed to facilitate fabrication of the VOA, as discussed in reference to FIGS. 19A–19K.

Figure 13B:
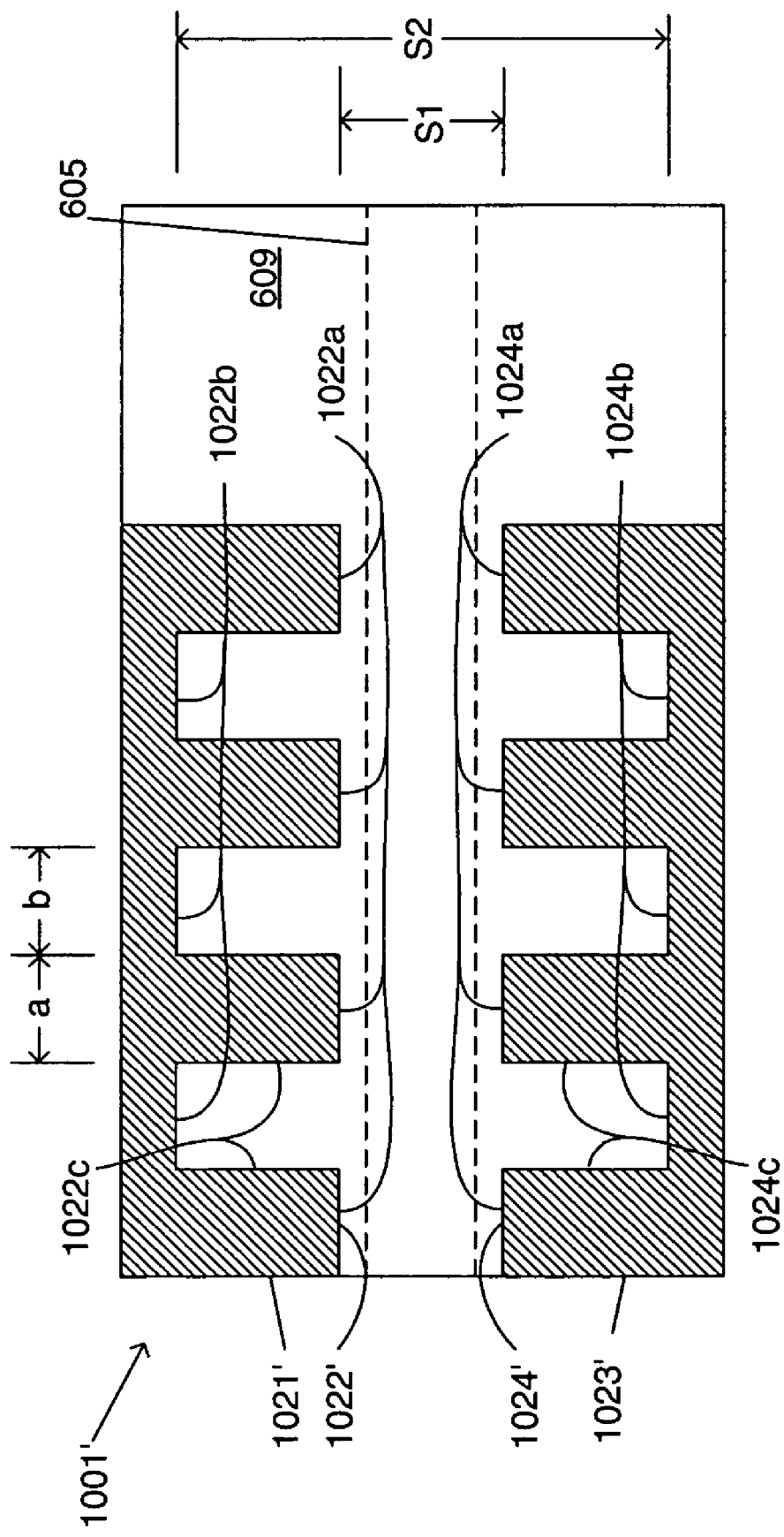

An alternative electrode arrangement, referred to herein as periodic electrodes, is presented in FIG. 13B, which is a planar sectional view 13—13 of FIG. 12A. Two alternative electrodes, electrode 1021' and 1023' present mutually opposing edges 1022' and 1023', respectively across EO cladding 609. Each edge 1022' and 1024' alternates between a first edge 1022a and 1024a having a width a, a second edge 1022b and 1024b having a width b, and an edge 1022c and 1024c between the "a" and "b" edges. The "a" and "b" edges are aligned such that the spacing between electrodes 1021' and 1023' is periodic along the length of the VOA, with a fraction a/(a+b) having a spacing of S1 and a fraction b/(a+b) having a spacing of S2. The alternating spacing results in an alternating R.I. in EO cladding 609 when there is a voltage difference between electrodes 1021' and 1023'.

Figure 16:
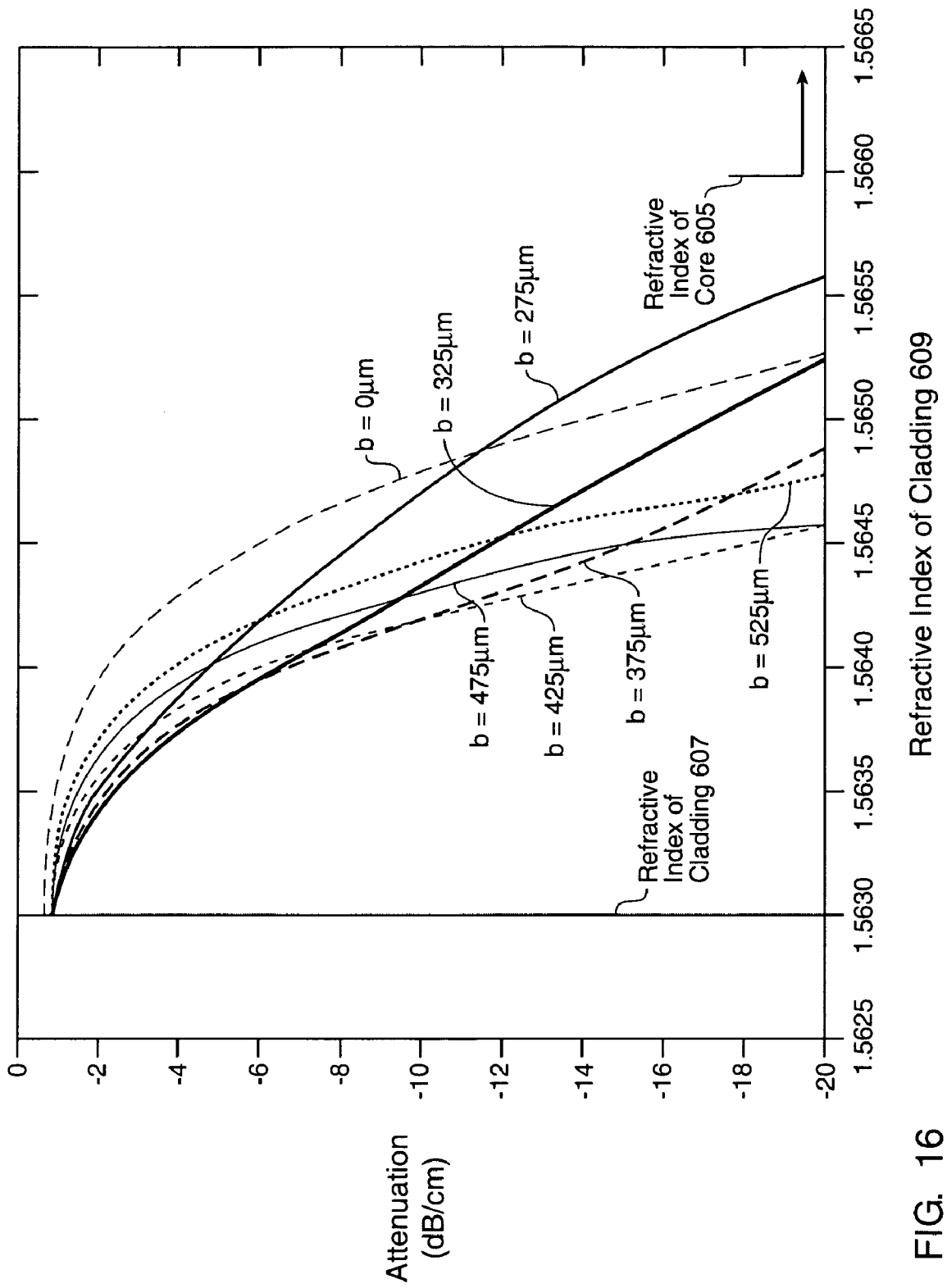
FIG. 16 is a graph showing the calculated attenuation in a VOA having a periodic electrode.

The attenuation due to R.I. changes resulting from an applied voltage difference was simulated by varying the R.I. within the space between electrodes. The attenuation of a VOA having electrodes according to FIG. 13B varies with S1, S2, a, and b of periodic electrodes 1022' and 1024'. In particular, the response of the attenuation with changes in the R.I. changes, permitting design control over the sensitivity of the change in attenuation with voltage difference. FIG. 16 is a graph showing the calculated attenuation, in dB/cm, of a VOA 1001', where S1=20 μm, S2=50 μm, a and b varied simultaneously from 275 μm to 525 μm, in increments of 50 μm. The curve marked "b=0 μm" represents a pair of straight electrodes. Increasing the value of b increases the attenuation for most values of b and cladding R.I. A value of b of 425 μm produces the largest attenuation for a given R.I. change.

Figure 19A:
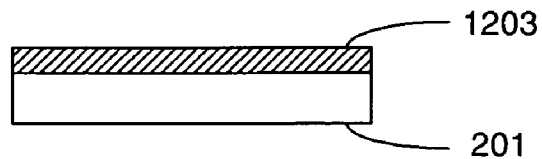
FIGS. 19A–19K shows the manufacturing steps for producing a VOA array 100.

There are several methods for manufacturing the VOA of the present invention. FIGS. 19A–19K presents a method for manufacturing VOA array 1001' using techniques that are well known in the field of microelectronics and fiber optic manufacturing. FIGS. 19A–19F show the formation of core 605 and cladding 1201 and 1203. As shown in FIG. 19A, substrate 201 formed from a silicon wafer is coated with the material of waveguide under cladding 1203.

Figure 19B:
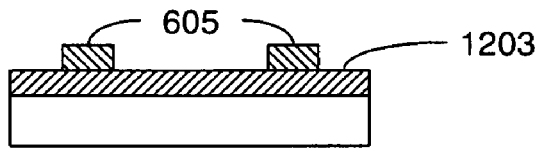
Figure 19C:
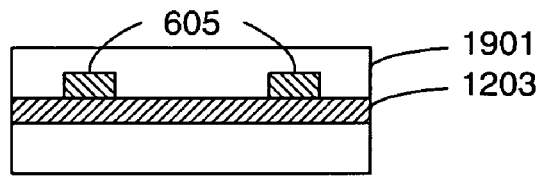
Figure 19D:
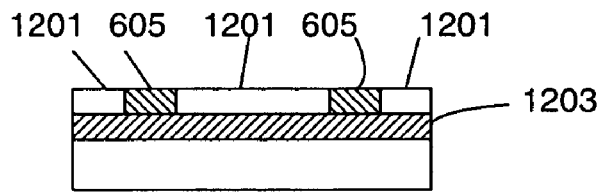
Figure 19E:
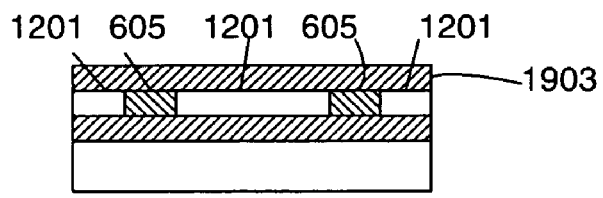
Figure 19F:
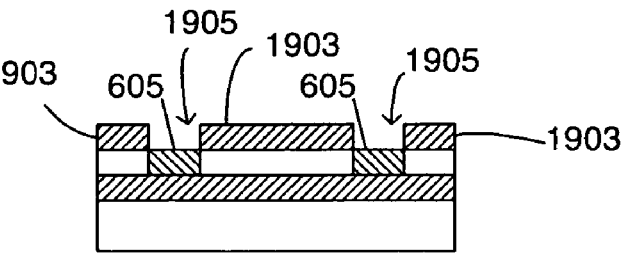

Coating is performed by the steps of spin coating or meniscus coating. Cladding 1203 may be, but is not limited to, a UV-curable epoxy. Core 605 is formed from a material having a lower R.I. than the materials of claddings 1201 and 1203, and may be, but is not limited to, another UV-curable epoxy. As shown in FIG. 19B, core 605 is formed by coating the core material (for example by spin coating or meniscus coating), exposing the coated core material to UV light in a pattern corresponding to cure the material where the core is required (UV patterning and curing), and etching the uncured core material by developing solution. The cladding is then finished from a cladding material 1901, which is, like the material of cladding 1203 is preferably, but not limited to a UV-curably epoxy, but which has a R.I. higher than that of core 605, by coating the cladding material over the core (for example by spin coating or meniscus coating) and curing the cladding material by exposing it to UV light (FIG. 19C), polishing the cladding material 1901, for example by chemical polishing or mechanical polishing to the top of core 605, as shown in FIG. 19D, thus forming cladding 1201. Material 1903 of cladding 1201 is then deposited over cladding 1201 and core 605 (FIG. 19E) for example by spin coating or meniscus coating, and trenches 1905 are formed through material 1903 and over core 605, as shown in FIG. 19F by plasma etching.

Figure 19G:
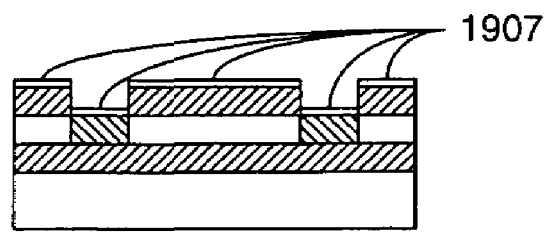
Figure 19H:
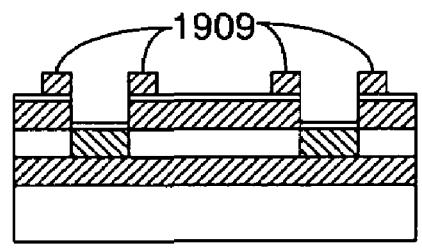
Figure 19I:
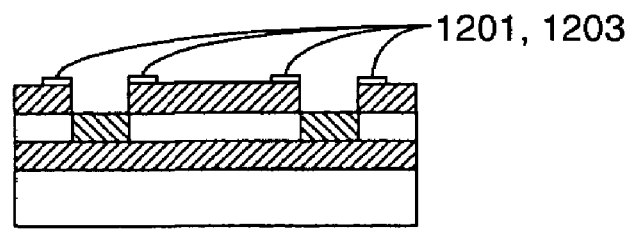

After core 605, under cladding 1203, and side cladding 1201 formed, the electrodes are provided next. As shown in FIG. 19G, metal 1907 is evaporated on the exposed portions of cladding 1201 and core 605. Evaporation can be performed by sputtering or vacuum-evaporation. Choices for metal 1907 include, but are not limited to titanium, copper, or gold. Resist 1909 is then patterned over metal 1907 in the locations where electrodes are to be located by coating and UV patterning the resist, as shown in FIG. 19H. Exposed metal 1907 is etched by acid preparation, and then etching resist 1909 is removed by photoresist strippers, as shown in FIG. 19I, resulting in electrodes 1021 and 1023 being in place over material 1205 and trench 1905 uncoated.

Figure 19J:
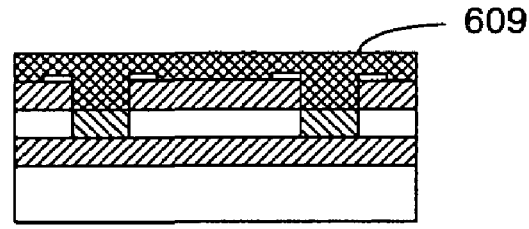
Figure 19K:
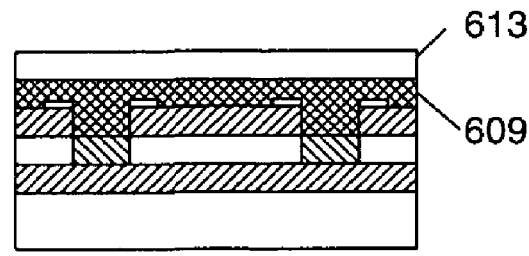

Next, the cladding of an electro-optic material is deposited and formed, as shown in FIG. 19J. Materials for cladding 609 include, but are not limited to a polycarbonate and a chromophore. As shown in FIG. 19K, drain layer 613, which is preferably a UV-curable epoxy with a R.I. similar to core 605 is coated next on top of EO cladding 609. After that, EO cladding 609 is poled with an electric field by application of DC voltage between electrodes 1201 and 1203, for example, at 10 V/um at 150° C. for one hour. The remaining steps, not presented here, provide vias to electrodes 1201 and 1203 if needed, followed by dicing the chip, the mounting of power meters 19, for example by flip-chip bonding technology with either gold or gold-tin bumps, and packaging the finished VOA 1001'.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof.

For example, other materials, electrode geometries, or control schemes may be used with the present invention. Accordingly, the disclosures and descriptions herein are intended to be illustrative, but not limiting, of the scope of the invention, which is set forth in the following claims.

What is claimed is:

1. A device for controllably attenuating an optical signal comprising:
   a waveguide including a core having a first refractive index and a cladding comprising a material with a second refractive index and an electro-optical (EO) material having a first side adjacent to said core and a second side distal from said core;
   a pair of electrodes to produce an electric field within said EO material and change the refractive index of said EO material; and
   a layer adjacent to said second side of said EO material and having a refractive index approximately equal to said first refractive index;
   where the proportion of light transmitted through said waveguide varies with the voltage applied to said pair of electrodes, and
   where at least a portion of incident light not transmitted through said waveguide is transmitted along said layer.

2. The device of claim 1, wherein the refractive index of said EO material varies with said applied voltage difference from said first refractive index to said second refractive index.

3. The device of claim 2, further including a substrate, wherein said cladding is on said substrate, wherein said layer has a side distal from said EO material, and wherein one of said pair of electrodes is between said substrate and said cladding, and wherein the other of said pair of electrodes is adjacent said layer distal side.

4. The device of claim 2, wherein each of said pair of electrodes are coplanar and parallel with said waveguide, wherein each of said pair of electrodes has an edge, wherein the pair of edges has a spacing, and wherein at least a portion of said EO material is between said pair of edges.

5. The device of claim 4, wherein said spacing is a regularly repeating spacing along said waveguide.

6. The device of claim 5, wherein the spacing repeats step-wise between a first spacing having a first longitudinally extent and a second spacing having a second longitudinal extent.

7. The device of claim 1, further including a substrate, and wherein said cladding is on said substrate.

8. The device of claim 1, further including a sensor, and wherein said layer is optically coupled to said sensor to produce an output proportional to the light transmitted along said layer.

9. The device of claim 8, further including a controller for controlling said applied voltage difference in response to said output.

10. An array of devices for controllably attenuating a plurality of optical signal comprising:
    a plurality of spaced waveguides, where each waveguide comprises
    a core having a first refractive index and a cladding including a material having a second refractive index and an electro-optical (EO) material having a first side adjacent to said core and a second side distal from said core;
    a plurality of pair of electrodes each corresponding to one of said plurality of waveguides, where each pair of electrodes produces an electric field within said EO material and changes the refractive index of said EO material of said corresponding one of said plurality of waveguides; and
    a plurality of layers each corresponding to one of said plurality of waveguides, where each layer is adjacent to said corresponding second side of said EO material and has a refractive index approximately equal to said first refractive index;
    where, for each of said plurality of waveguides, the proportion of light transmitted through said waveguide varies with the voltage applied to said pair of electrodes, and
    where, for each of said plurality of waveguides, at least a portion of incident light not transmitted through said waveguide is transmitted along said corresponding layer.

11. The device of claim 10, wherein the refractive index of said EO material varies with said applied voltage difference from said first refractive index to said second refractive index.

12. The device of claim 11, further including a substrate, wherein said cladding is on said substrate, wherein one of each of said pair of electrodes is between said substrate and said cladding, and wherein the other of each of said pair of electrodes is adjacent said layer distal side.

13. The device of claim 11, wherein each of said pair of electrodes are coplanar and parallel with said waveguide, wherein each of said pair of electrodes has an edge, wherein the pair of edges has a spacing, and wherein at least a portion of said EO material is between said pair of edges.

14. The device of claim 13, wherein said spacing is a regularly repeating spacing along said waveguide.

15. The device of claim 14, wherein the spacing repeats step-wise between a first spacing having a first longitudinally extent and a second spacing having a second longitudinal extent.

16. The device of claim 10, further including a substrate, and wherein said cladding is on said substrate.

17. The device of claim 10, further including a plurality of sensors, and wherein each of said plurality of layers is optically coupled to one of said plurality of sensors to produce an output proportional to the light transmitted along said corresponding layer.

18. The device of claim 17, further comprising a controller for controlling said applied voltage difference to each of said plurality of electrodes in response to said corresponding output.

* * * * *